US010992585B1

(12) United States Patent
Gilman et al.

(10) Patent No.: US 10,992,585 B1
(45) Date of Patent: Apr. 27, 2021

(54) UNIFIED NETWORK TRAFFIC CONTROLLERS FOR MULTI-SERVICE ENVIRONMENTS

(71) Applicant: Amazon Technologies, Inc., Seattle, WA (US)

(72) Inventors: Timothy A. Gilman, Puyallup, WA (US); Houman Hassani Jalilian, Seattle, WA (US); Taras Alenin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 16/408,290

(22) Filed: May 9, 2019

(51) Int. Cl.
*H04L 12/851* (2013.01)
*H04L 29/08* (2006.01)
*H04L 12/24* (2006.01)
*H04L 12/26* (2006.01)

(52) U.S. Cl.
CPC ...... *H04L 47/2441* (2013.01); *H04L 41/0813* (2013.01); *H04L 43/08* (2013.01); *H04L 67/10* (2013.01)

(58) Field of Classification Search
None
See application file for complete search history.

(56) References Cited

U.S. PATENT DOCUMENTS

| 7,299,294 | B1 | 11/2007 | Bruck et al. |
| 7,433,304 | B1 | 10/2008 | Galloway et al. |
| 7,742,406 | B1 | 6/2010 | Muppala |
| 8,089,875 | B2 | 1/2012 | Fraccalvieri et al. |
| 8,527,647 | B2 | 9/2013 | Gopalakrishnan |
| 8,868,725 | B2 | 10/2014 | Samba |
| 9,479,447 | B2 | 10/2016 | Samuels et al. |
| 2003/0182580 | A1 | 9/2003 | Lee |
| 2012/0033666 | A1* | 2/2012 | Holness ............ H04L 45/16 370/389 |
| 2019/0052532 | A1* | 2/2019 | Chen ............... H04L 41/0896 |
| 2020/0236621 | A1* | 7/2020 | Yamada ............ H04M 15/58 |

OTHER PUBLICATIONS

Amazon CloudWatch: User Guide, 2019 Amazon Web Services, Inc.
U.S. Appl. No. 16/408,288, filed May 9, 2019, Timothy A. Gilman.

* cited by examiner

*Primary Examiner* — Jutai Kao
(74) *Attorney, Agent, or Firm* — Robert C. Kowert; Kowert, Hood, Munyon, Rankin & Goetzel, P.C.

(57) ABSTRACT

One or more multi-service network traffic controllers are established for a distributed system. The controllers are connected to traffic control implementation units at a first service and a second service. Based at least in part on data collected from a traffic control implementation unit deployed at the second service, a modification to be made to a parameter of a traffic control implementation unit deployed at the first service is determined at the controllers. The modification is applied at the first service, and results in a change to a traffic flow of the second service.

20 Claims, 18 Drawing Sheets

UNIFIED NETWORK TRAFFIC CONTROLLERS FOR MULTI-SERVICE ENVIRONMENTS

BACKGROUND

Many companies and other organizations operate computer networks that interconnect numerous computing systems to support their customer-facing applications and services, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Using large distributed systems comprising combinations of such resources spread over many data centers, Internet-scale applications for potential customers throughout the world (such as retail web sites, content distribution web sites, and the like) are being implemented.

At least some request-response data flows of a customer-facing application may utilize resources of a number of separate services implemented within such a large distributed system. For example, for an online retailer's web sites, one or more services may be responsible for rendering the web pages presented to customers, another set of services may be responsible for implementing purchasing transactions, inventory management so on, and yet another set of services may be responsible for database or storage-related operations of the retailing data flows.

Different combinations of services may be invoked for respective task data flows, with network messages flowing between the services at varying rates to accomplish respective tasks on behalf of potentially large numbers of concurrent customers. In many distributed systems, each service of a group of services that collectively implements a given data flow may have its own set of application programming interfaces which are invoked over network connections during a given instance of the task, and each service may have its own local service-level objectives for availability, performance and the like. In some cases, individual services may be designed, developed and modified over time by a respective group of engineers. Dozens or even hundreds of services may sometimes be utilized within a distributed system to implement a single type of task. Local network traffic management decisions made at some services may potentially have unintended negative consequences at other services. Managing the flow of network traffic in such complex multi-service environments may present a non-trivial technical challenge.

Figure 1:
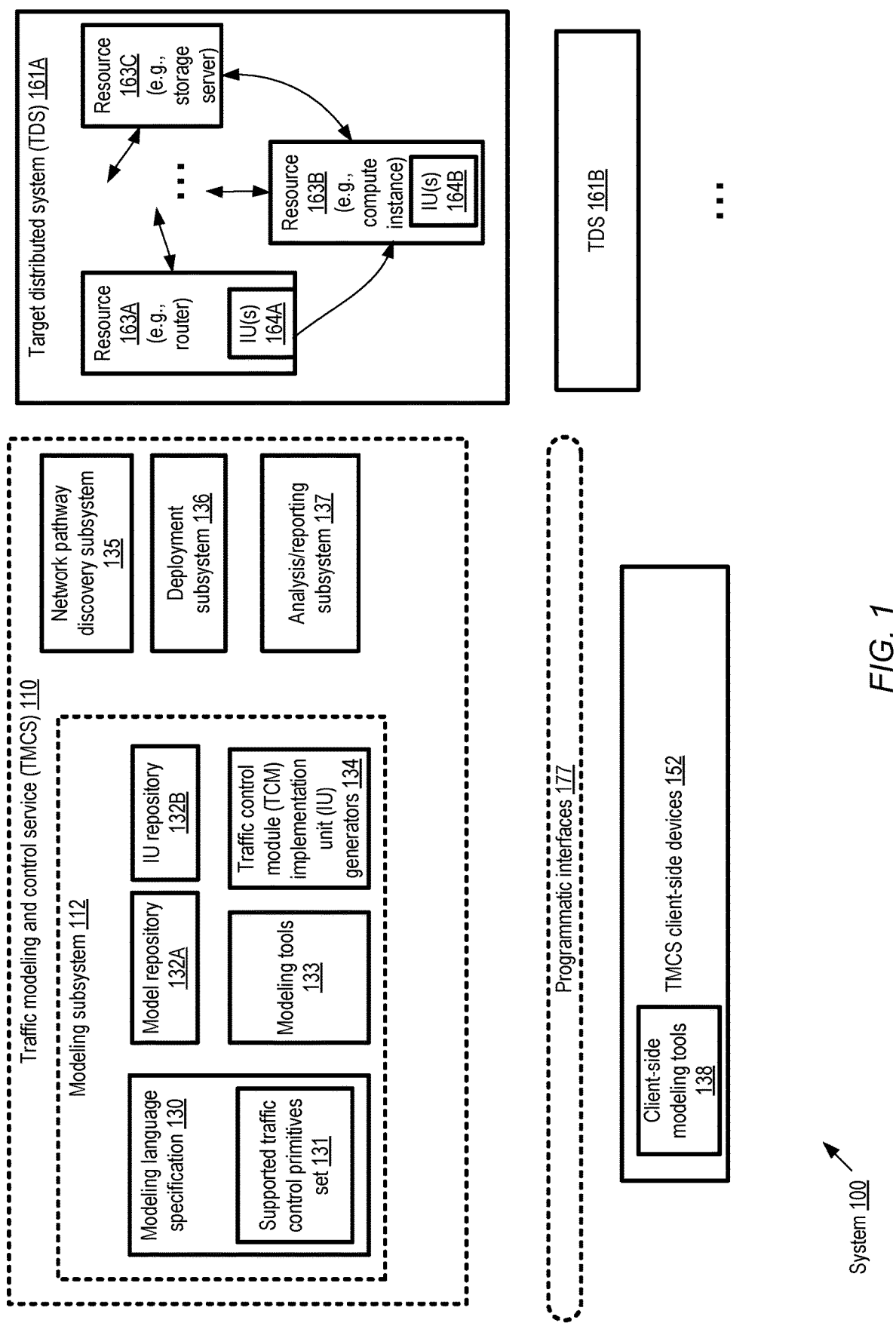
FIG. 1 illustrates an example system environment in which a network traffic modeling and control service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for modeling and controlling network traffic of large-scale distributed systems, including for example systems in which network messages flow among numerous different services, implemented using respective resource sets, to fulfil a given task or dataflow. According to some embodiments, a traffic modeling and control service (TMCS) may offer a variety of resources and tools, including for example a rich extensible language for modeling various aspects of network traffic control, and a graphical tool for constructing models of the distributed systems. Such a language may enable TMCS clients to construct easy-to-understand models, within which customizable parametrized instances of traffic control primitives may represent traffic classification operations, flow change decisions, mechanisms for implementing the flow change decisions, traffic telemetry collection and recording, and so on. A given instance of a primitive of the modeling language may represent a traffic control module (TCM) which can be deployed or activated at one or more resources or traffic entry/exit points within the distributed system. Any of a variety of implementation techniques may be used for the TCMs in different embodiments—e.g., in some embodiments an instance of a given TCM may be implemented as a process or program running within a software container at a hardware server at which a portion of a service is implemented, or a given TCM may be implemented as a user-mode process, a kernel daemon, a virtual machine, and so on. In some embodiments, the TMCS may enable its clients to request that implementation units (e.g., executable user-mode programs, software containers, virtual machines, firmware programs, etc.) corresponding to individual TCMs of a model be generated, deployed to and/or activated at target resources of a distributed system. Using such deployed TCM implementation units, a number of different types of rules for traffic classification, measurement and control may be enforced in various embodiments. Reports of the operations performed at the deployed TCMs, as well as the results (e.g., changes of traffic flow, improvements in performance, higher availability, and the like) of the operations performed may be presented (e.g., via dashboards or other interfaces) to the TMCS clients in some embodiments.

In some embodiments, numerous services implemented using respective resource subsets of a distributed system may be used collectively to implement a given task requested by a customer of a given application or higher-level service. For example, when a customer of an online retailer's web site interacts with the web pages of the site, one set of internal services running at the data centers of the retailer may be used for rendering the web pages, another set of services (potentially at different data centers) may be used for executing the business logic associated with a requested purchase or other retail transaction, and yet another set of services may be employed to store persistent records of the transaction. In some cases, each of the internal services may have its own set of traffic management or control rules, as well as its own set of objectives with respect to performance, availability and the like. It may sometimes be the case that a traffic control decision made locally at one service of such a collection of services collectively implementing a multi-service task may have unintended negative consequences (e.g., causing excessive queuing or even dropped packets) at operations at another service, thereby impacting the overall quality of service perceived by a customer on whose behalf the task is being performed.

In order to mitigate and/or reduce the probability of such problematic situations, in some embodiments one or more multi-service network traffic controllers (MNTCs) may be configured and employed, e.g., along with traffic control models of the kind discussed above. Respective collections of TCM implementation units (e.g., with each TCM representing an instance of a respective primitives or derived TCM type of the modeling language supported by a TMCS) may be activated at the resources of the different services involved in a multi-service task or dataflow. The MNTCs may collect traffic-related data generated at the TCM implementation units of the different services, and use the collected data to initiate traffic changes at one or more of the services, e.g., to help achieve end-to-end objectives for the multi-service tasks. For example, data collected from TCMs deployed at one service Svc1 may be used to identify a parameter change or other change to be applied at one of the TCMs deployed at another downstream or upstream service Svc2 to modify network traffic associated with the multi-service dataflow. Each of the services may have its own set of local or service-level traffic control rules (and/or service-level traffic controllers), and in at least some cases the traffic control decisions made by the MNTCs may differ from (or even contradict) control decisions that would have been made locally at the individual services. In at least some embodiments, as various traffic control-related modifications are made at the different services by the MNTCs and metrics indicating the results of the modifications are collected, the results may be presented via programmatic interfaces such as graphical consoles or the like. In some embodiments, hierarchies of MNTCs, with some MNTCs representing logical services representing groups of lower-level services that implement similar functionality, may be deployed, with individual ones of the MNTCs passing network traffic information on to higher-level MNTCs for aggregated system-wide analysis. Such holistic approaches towards traffic management may enable quicker responses to problem situations such as dropped requests, slowdowns, unresponsive or hanging application processes, outages, and the like in various embodiments.

As one skilled in the art will appreciate in light of this disclosure, certain embodiments may be capable of achieving various advantages and practical applications/benefits, including some or all of the following: (a) enhancing the overall performance and availability of applications and/or services running in large-scale distributed systems, (b) enhancing the user experience and responsiveness of administrators, support teams and the like that are responsible for analyzing network slowdowns, outages and other problem situations within complex distributed systems, and/or (c) enabling faster transfers of knowledge, using a common traffic control modeling language, among disparate teams involved in implementing and supporting complex distributed systems.

According to one embodiment, a system may comprise one or more computing devices. The computing devices may include instructions that when executed on or across one or more processors cause the computing devices to provide, via one or more programmatic interfaces, an indication of a plurality of traffic control primitives from which traffic control models can be generated. A variety of combinations of such primitives may be supported, e.g., at a traffic modeling and control service (TMCS) in some embodiments, including a classifier primitive, a flow change decider primitive, a regulator primitive, a telemetry recording primitive and the like. In some embodiments, customized extensions or modifications of the base set of supported primitives may be created and used by various clients of a TMCS. Via the one or more of the programmatic interfaces, an indication of a traffic control model may be obtained at the computing devices. Such a model may include, for example, (a) a plurality of traffic control modules, wherein individual ones of the traffic control modules comprise respective instances of traffic control primitives, and (b) linkage information of the plurality of traffic control modules, in effect indicating the flow of traffic control-related information among the different modules. For example, the linkage information may indicate that output produced by a first traffic control module (such as classification information pertaining to a particular flow of network messages), is to be consumed at a second traffic control module (e.g., a flow change decider module at which decisions may be made to re-route messages of a particular class indicated in the classification information). The traffic control primitives may be considered the logical equivalent of parameterizable templates for various types of traffic management tasks in some embodiments, while a TCM may represent the logical equivalent of a template with a particular set of values selected for its parameters.

Corresponding to at least some TCMs of the model, respective implementation units may be generated in some embodiments, e.g., using the computing devices of the TMCS. The model may be considered analogous to a source code version of a program for traffic management in some embodiments, while the collection of implementation units (IUs) generated for the TCMs of the model may be considered analogous to a compiled or executable version of the source code. In some embodiments, a library of executable code modules, each representing a skeleton or baseline implementation of the logic of a primitive of the modeling language, may be maintained at a TMCS, and IUs may be generated from such skeletons by filling in the appropriate parameter values relevant to targeted resources of a distributed system of interest. Respective IUs may be activated and/or deployed at various resources of the distributed system, where they may be used to perform the traffic management tasks of one or more applications implemented at the distributed system. As a result of the performed tasks, the flow of network traffic at various points within the distributed system may be modified—e.g., more traffic may be directed to one resource than another, some messages may be delayed relative to others due to queueing, and so on. Indications of such modifications to network traffic, engineered via the implemented TCMs, may be presented to one or more recipients or destinations in various embodiments.

According to another embodiment, a system may comprise another set of one or more computing devices. The computing devices may include instructions that when executed on or across one or more processors cause the computing devices to establish one or more multi-service network controllers (MNTCs) for a distributed system at which a plurality of network-accessible services are used collectively for one or more tasks. Respective collections of traffic control module IUs may be activated at the resources of individual ones of the plurality of services in various embodiments. A given IU may comprise an instance of a primitive defined in a traffic control modeling language, such as a classifier primitive, a flow change decider primitive, a regulator primitive, and so on. At individual ones of the services, respective sets of programmatic interfaces such as application programming interfaces (APIs) may be invoked (e.g., from other services of the plurality of services) to perform parts of the overall multi-service task's dataflow in various embodiments. In addition, in some embodiments, a respective service-level set of traffic control rules may be implemented or enforced locally at each service. At the one or more MNTCs, collect, traffic data generated at a plurality of IUs, including at least one IU of a first service and at least one IU of another service may be collected and analyzed, e.g., using a rules engine, a machine learning model, or the like. Based at least in part on the data from one of the services, a modification to be made to a parameter of an IU at a different service may be identified at the MNTCs in some embodiments. The modification may be applied, e.g., as a result of a command issued by the MNTCs. In some embodiments, indications of changes to network traffic resulting from the modification may be presented via one or more programmatic interfaces such as a graphical console.

Example System Environment

FIG. 1 illustrates an example system environment in which a network traffic modeling and control service may be implemented, according to at least some embodiments. As shown, system 100 comprises resources and artifacts of a traffic modeling and control service (TMCS) 110, including a modeling subsystem 112, an analysis and reporting subsystem 137, a deployment subsystem 136 and a network pathway discovery subsystem 135 in the depicted embodiment. The TMCS 110 may implement one or more programmatic interfaces 177, such as a web-based console, a set of application programming interfaces (APIs), command line tools, graphical user interfaces and the like that may be used by TMCS clients from client side devices 152 (e.g., laptops, desktops, tablets, phones and the like) to submit various types of requests to the TMCS and receive corresponding responses. The TMCS may be used in various embodiments to generate models of the network traffic flows of various applications or services implemented at one or more target distributed systems (TDSs) 161, such as TDS 161A or 161B. The models may include instances of a number of types of traffic control modules that may be activated at various points within the target distributed systems. The models may serve a number of different purposes in various embodiments, including, among others: (a) providing easy to understand overviews of the manner in which network traffic flows between various resources 163 (e.g., resources 163A, 163B, or 163C) implementing applications and services, (b) enabling system administrators and other users to set and enforce parameters and rules for dynamic data driven modifications to the traffic patterns at the target distributed systems, and/or (c) providing feedback to the TMCS users regarding the impact of the parameters and rules.

In some embodiments, the modeling subsystem 112 may include a modeling language specification 130 that can be used to design traffic control models of various distributed or non-distributed systems. The language specification may for example include a supported set 131 of traffic control primitives, which may be considered building blocks from which the models can be constructed. The primitives may be considered analogous to data types of programming languages in some embodiments, while instances of the primitives, referred to as traffic control modules or TCMs, may be considered analogous to variables or instantiated objects of the corresponding types. In some embodiments, the modeling language 130 may be extensible—e.g., a TMCS client may extend the core set of supported primitives, creating custom TCM types if desired, instances of which may then be incorporated within models. A set of modeling tools 133, e.g., with graphical user interfaces and/or interfaces to which text files, JSON (JavaScript Object Notation) files or the like can be provided as input, may be provided to TMCS clients in some embodiments. Using such tools, TMCS clients may obtain indications of the supported primitives 131, the manner in which a graph of such primitives may be generated to represent a given traffic control architecture for a TDS 161, and so on. The tools 133 may be used to generate traffic control models, which may then be stored in a persistent repository 132A of the TMCS if desired. A given traffic control model may in effect comprise a graph with a plurality of nodes connected by a plurality of edges, with at least some of the nodes comprising TCMs, and with at least some of the edges representing the flow of traffic control data or metadata among the TCMs. Model nodes may also, for example, be used to represent resources 163 of the target distributed systems, and/or logical constructs such as "bit buckets" representing discarded messages in some embodiments. In one embodiment, at least some edges of the graph may also represent the flow of application data among the resources of the TDSs; note that the flow of application data may not necessarily correspond to the flow of traffic control data or metadata. For example, telemetry data collected at one TCM, TCM1, associated with a resource R1 may be transmitted to another TCM TCM2 at another resource R2, while application data may flow from R2 to R1 in one scenario. In some embodiments, one or more client-side modeling tools 138 may be downloaded for installation at client-side devices 152; such tools may for example enable clients to create, view, modify or even deploy elements of traffic control models without requiring connectivity to the back-end resources of the TMCS.

Using the tools 133 and/or 138 supported by the TMCS, a traffic control model comprising a plurality of TCMs, each representing an instance of a primitive or other TCM data type of the modeling language, may be generated in the depicted embodiment. Each model may indicate information about its constituent TCMs, as well as linkage information indicating the directions in which traffic control related data/metadata flows between individual TCMs. The models may be obtained, e.g., via the programmatic interfaces 177, at the TMCS before being stored in one or more repositories such as 132A in some embodiments. In at least some embodiments, the modeling subsystem 112 may implement query or search interfaces (e.g., part of the programmatic interfaces 177) which can be used by TMCS clients, for example, to identify pre-existing models that can be used as starting points or examples for new models.

In at least some embodiments, in addition to enabling representations of traffic control models to be generated, executable versions of the model's TCMs may also be generated at the TMCS 110 and/or deployed via the TMCS 110 to target distributed system resources 163. One or more TCM implementation unit generators 134 may be used to produce such executable versions of the TCMs. Any of a variety of implementation techniques may be supported for TCMs in different embodiments—e.g., for some TCMs, executable user-mode programs may be generated, while for others, software containers may be generated or virtual machines may be generated. The term "implementation unit" (IU) may be used to refer generically to the versions of TCMs that can be deployed to and/or activated at various points or resources within target distributed systems to perform traffic control related operations in various embodiments. In some embodiments, at least some IUs may comprise hardware elements such as systems-on-chip, FPGAs (Field Programmable Gate Arrays) or the like that may already be present at a resource 163, and such elements may be activated or enabled by the TMCS on behalf of a client. IUs produced for the TCMs of a model by the IU generators 134 may be stored within one or more persistent repositories such as repository 132B in the depicted embodiment. In at least some embodiments, software code (e.g., in the form of source code, scripts, executable code or the like) which can be used to implement one or more TCMs may be provided via programmatic interfaces to the TMCS by clients, and stored in a repository.

In some embodiments, a deployment subsystem 136 of the TMCS may be utilized, e.g., in response to a programmatic request from a TMCS client, to transmit and deploy one or more IUs to a resource 163 of a TDS 161. IUs may be deployed at a variety of different resources in various embodiments, such as compute instances or virtual machines of a virtualized computing service, un-virtualized servers, networking intermediary devices (such as routers, switches and the like), storage servers and so on. For example, in the scenario depicted in FIG. 1, one or more IUs 164A may be deployed to resource 163A comprising a router, while one or more IUs 164B may be deployed to a compute instance. Note that not all the resources of a target distributed system may have associated IUs deployed—for example, resource 163C may comprise a storage server without any associated IUs of a traffic control model.

The deployed/activated IUs may perform their respective traffic control operations on the network messages flowing at the target distributed systems 161 in the depicted embodiment. The specific types of operations that are performed at a given IU may differ based on the type of TCM being implemented; examples of the different types of TCMs corresponding to the supported primitives 131 are provided below, along with various properties of the TCMs. Some TCMs and the corresponding IUs may, for example, classify traffic, while others may make decisions on whether traffic flows are to be changed, and yet others may enforce such decisions using various mechanisms. As a result of the operations performed by the IUs, network traffic patterns at various points within the target distributed system 161 may be modified, e.g., to enable system-level objectives to be achieved. Indications of the changes to network traffic resulting from the operations may be provided by the TMCS 110 to clients in some embodiments. For example, an analysis/reporting subsystem 137 may capture metrics from some IUs 164 periodically, and generate a graphical representation of the changes to the traffic for presentation to client-side devices 152. In some embodiments, the TMCS 110 may include a network pathway discovery subsystem 135. Such a subsystem may be employed, for example, to discover the paths over which traffic starting from (or ending at) a specified endpoint flows, e.g., to identify the current layout of at least a portion of a given potential target distributed system. A TMCS client may, for example, provide IP addresses of one or more endpoints within a distributed system, and request that a representation of the destinations of messages generated at the endpoints be provided. The network discovery subsystem 135 may itself employ a traffic flow recording tool or service in some embodiments, which analyzes logs of message routing decisions or transfers at various networking devices in some embodiments.

Example Primitives for Modeling Traffic Control

Figure 2:
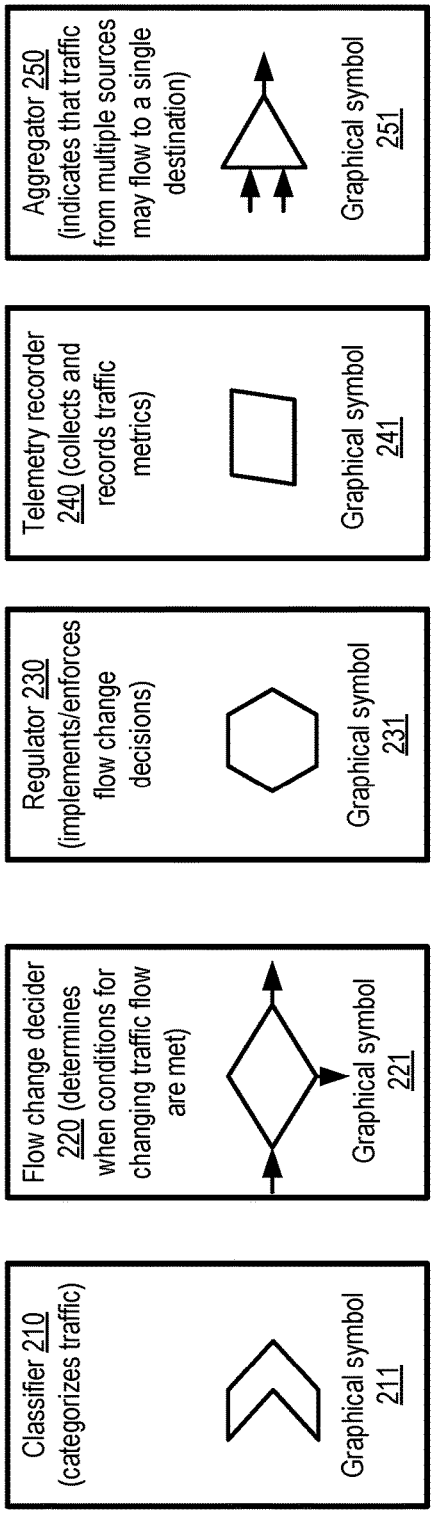
FIG. 2 illustrates example traffic control primitives that may be utilized to model network traffic of a distributed system, according to at least some embodiments.

As indicated earlier, a language for representing traffic control elements of distributed systems may include a number of baseline traffic control module primitives, which can be combined in various ways to generate traffic control models in various embodiments. FIG. 2 illustrates example traffic control primitives that may be utilized to model network traffic of a distributed system, according to at least some embodiments. The example traffic control primitives 200 may include, among others, a classifier primitive 210, a flow change decider primitive 220, a regulator primitive 230, a telemetry recorder primitive 240, and/or an aggregator primitive 250 in the depicted embodiment. A given traffic control model may, for example, comprise a graph whose nodes represent respective traffic control modules (TCMs), with individual modules comprising respective instances of a given primitive, and links between the TCMs representing the flow of traffic control data or metadata in some embodiments. Individual ones of the TCMs of a model may be represented via respective graphical symbols of the corresponding primitive in some embodiments, e.g., within a modeling tool of the kind discussed below in the context of FIG. 3. For example, graphical symbols 211, 221, 231, 241 and 251 may be used for classifier TCMs, flow change detector TCMs, regulator TCMs, telemetry recorder TCMs, and aggregator TCMs respectively in the depicted embodiment.

A classifier 210 may be used to categorize traffic flowing into a distributed system from one or more external sources, traffic flowing to or from a set of one or more resources within a distributed system, or traffic flowing from a distributed system to one or more external destinations in the depicted embodiment. Classifiers may in effect represent answers to the question "which types of traffic messages are to be controlled?" by a particular rule in various embodiments. That is, respective traffic control rules may be enforced for different categories of traffic identified by classifiers in at least some embodiments. As discussed below, any of a number of properties of a network message, such as the source IP (Internet Protocol) address, an identifier of a submitter or source of the message, etc., may be used to classify network messages in various embodiments. Classifiers may be designed to categorize messages with a very low overhead, so as not to cause delays in message transfers in at least some embodiments. In some embodiments, the class or category of a message, identified by an instance of a classifier 210, may be transmitted along with the message itself, e.g., as part of a header; in other embodiments, information about the category of a message may be transmitted separately to instances of other TCMs from classifier instances.

As indicated by the name, flow change detectors (FCDs) 220 may be used to make decisions regarding whether the flow of traffic at various points within a distributed system should be modified (e.g., by changing the fractions of messages that are sent from a given source to respective destinations of a group of destinations, by dropping messages etc.) in various embodiments. Such decisions may be based on detecting conditions such as resource overloads, measurements of traffic rates, and so on in some embodiments, as discussed below in further detail. In effect, FCDs may answer questions of the form "should the traffic flow be changed, and if so, when?" for one or more categories of traffic, or all traffic, at a given resource or set of resources.

Regulators 230 may implement or enforce the decisions made at the flow change deciders in various embodiments, using any of various mechanisms based on the decision type as discussed below in further detail. Regulators may in effect answer questions of the form "how is the traffic flow changed?" in scenarios where decisions to modify traffic flow are made.

Telemetry recorders 240 may be responsible for capturing measurements associated with network traffic of one or more categories, storing such measurements for some period if needed, and transmitting them to various destinations (e.g., to FCDs, or to clients of a traffic monitoring and control service) in various embodiments. The measurements may be expressed for example in units such as messages/second, megabytes/second or the like. In some embodiments, telemetry recorders may also capture and record auxiliary measurements such as resource utilizations, queue lengths and the like, which may also be helpful in making traffic control decisions or in representing the state of a distributed system.

Aggregators 250 may be used to model merging traffic, e.g., to represent scenarios when respective streams of messages from a plurality of sources are all directed to a common destination. Instances of aggregators may simply be considered a modeling convenience used to represent the occurrences of such traffic merges, and may not require any processing or actions in the deployed versions of the models; as such, implementation units may not have to be created for aggregators in at least some embodiments.

In some embodiments, the modeling language supported at a TMCS may be extensible, in that users may create custom TCM types 260 and include instances of such types within their models. In one embodiment, if/when a TCMs client creates such a custom TCM type 260 (e.g., by extending a primitive type in some way, or by generating an entirely new primitive type), the client may also provide guidance to the TMCS indicating how implementation units are to be generated for instances of the new type. In some embodiments, clients may transmit program code (e.g., in source form, or in executable form) to the TMCs for the implementation units of custom TCM types 260.

Example Graphical Interface for Modeling Traffic Control

Figure 3:
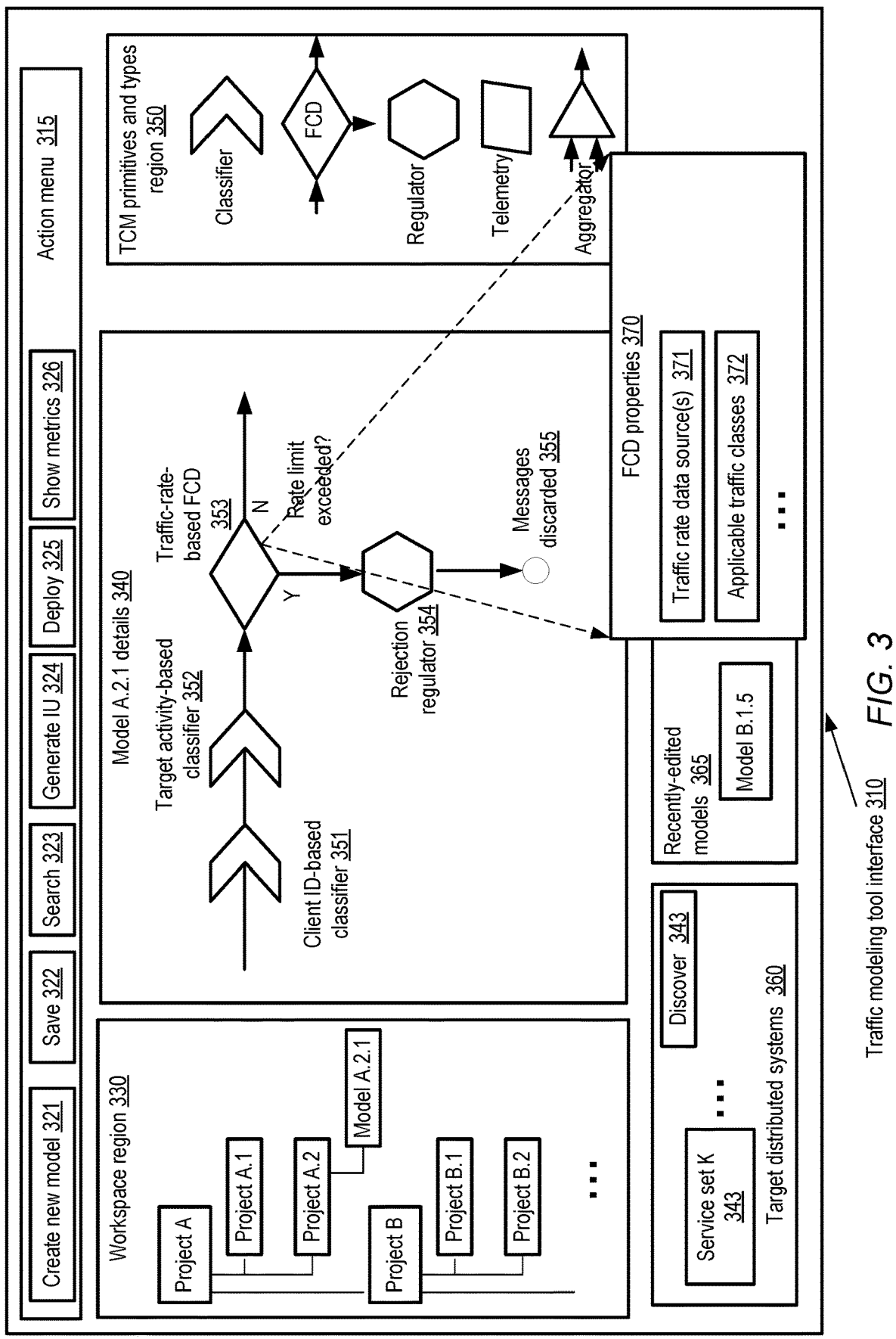
FIG. 3 illustrates an example of a graphical network traffic modeling tool interface, according to at least some embodiments.

FIG. 3 illustrates an example of a graphical network traffic modeling tool interface, according to at least some embodiments. In the depicted embodiment, a traffic modeling tool interface 310 may comprise, for example, an action menu 315, a workspace region 330, a model details region 340, a TCM primitives and types region 350, a target distributed systems region 360, and/or recently-edited models region 365. The interface 310 may be presented to traffic modelers such as TMCS clients via one or more web pages in some embodiments. One or more computing devices, e.g., at a TMCS, may implement the logic of the tool which presents interface 310 to TMCS clients in various embodiments. In other embodiments, a standalone tool that does not necessarily require connectivity to the world-wide-web may implement an interface similar to interface 310.

The action menu portion 315 of the interface 310 may enable a client to choose, using interface elements such as 321, 322, 323, 324, 325, or 326 the particular traffic modeling related task to be performed. Individual ones of the interface elements 321-326 may comprise respective clickable buttons in some embodiments. The client may create a new model using interface element 321 or save the model being edited currently to a repository using the interface element 322. A search element 323 may be used to look up earlier-created models stored at a repository in the depicted embodiment, e.g., based on one or more search parameters such as the names of models, the identities of model creators, the dates/times of model creation, the targeted distributed systems of the earlier-created models, the types of TCMs in the pre-created models, the number of TCMs in the pre-created models, and so on.

The "generate IU" interface element 324 may be used to request the creation of executable or deployable implementation units for at least some TCMs of a model. In effect, a request to generate one or more IUs may be considered analogous to a request to compile source code into executable code in some embodiments, with the source code being analogous to the TCMs of a model, and the IUs analogous to the executable code. A "deploy" interface element 325 may be employed to request the deployment and/or activation of IUs to a target set of resources of a distributed system in some embodiments. A show metrics interface element 326 may be used in some embodiments to view metrics obtained from a deployed version of a model, e.g., including metrics indicating changes to traffic flow resulting from decisions made at the deployed IUs corresponding to the TCMs of the model.

The workspace region 330 may be used to indicate a hierarchy of projects or folders within which various models are created in the depicted embodiment. For example, the hierarchy may include top-level projects "Project A" and "Project B", with respective sets of sub-projects (e.g., sub-projects "Project A.1" and "Project A.2" of "Project A", and sub-projects "Project B.1" and "Project B.2" of "Project B"), and so on. A model labeled "Model A.2.1" within "Project A.2" is being created in the example scenario shown in FIG. 3, and an expanded view of that model is shown in the details section 340.

A client may drag and drop symbols of various primitives (e.g., classifiers, flow change deciders, regulators, telemetry recorders, or aggregators) or other TCM types supported in the modeling language from region 350 into the details region to represent respective TCM instances of the model, and link up the TCM instances as desired using a connector element of the interface (the connector element itself is not shown in FIG. 3). As shown, the displayed version of the model A.2.1 being edited includes instances of two classifiers (a client-ID based classifier 351 and a target activity-based classifier 352), one instance of a flow change decider (traffic-rate-based FCD 353) and one instance of a regulator (rejection regulator 354). The details section may also include other types of symbols and/or annotations in the depicted embodiment, and may not be limited to displaying only TCMs—for example, the annotations "Rate limit exceeded?", "Y" (for "yes") and "N" (for "no") may be added by the client to the model, and a "messages discarded" symbol 355 may be included to indicate messages rejected by regulator 354.

Various details pertaining to individual TCMs or other elements of the model may be entered, for example, via pop-up elements such as FCD properties 370 that are presented when a TCM symbol is clicked on or otherwise highlighted. In the FCD properties element 370 associated with TCD 353, a client may for example enter indications of one or more traffic rate data sources 371, the specific traffic classes/categories to which the rate-based flow change decisions made at FCD 353 are to be applied, and so on. Different rules or decision-making algorithms may be applied for respective categories of traffic of a given traffic flow in at least some embodiments.

The recently-edited models region 365 may display models that have been edited in the recent past in some embodiments, such as model B.1.5. Details of such models may be retrieved by for example clicking on the icons representing the models instead of navigating the workspace hierarchy or using the search element 323. The target distributed systems region 360 may be used to display icons representing various distributed systems at which IUs of the models may be deployed and/or activated in the depicted embodiment. For example, an icon labeled "Service set K" 343, representing a target distributed system comprising resource of multiple network-accessible services is shown in region 360 of FIG. 3. A client using the traffic modeling tool may request that traffic flow paths within one or more distributed systems be identified using interface element "Discover" 343 in the depicted embodiment. In response, the destinations of messages originating at one or more specified endpoints, and/or the sources of messages received at one or more specified endpoints, may be identified to help the client to define the boundaries of a desired target distributed system. In various embodiments, interface elements other than those shown in FIG. 3 may be implemented for a traffic modeling tool, or the elements shown may be arranged in a manner different than that shown in FIG. 3.

Example Properties of Classifier Traffic Control Modules (TCMs)

Figure 4:
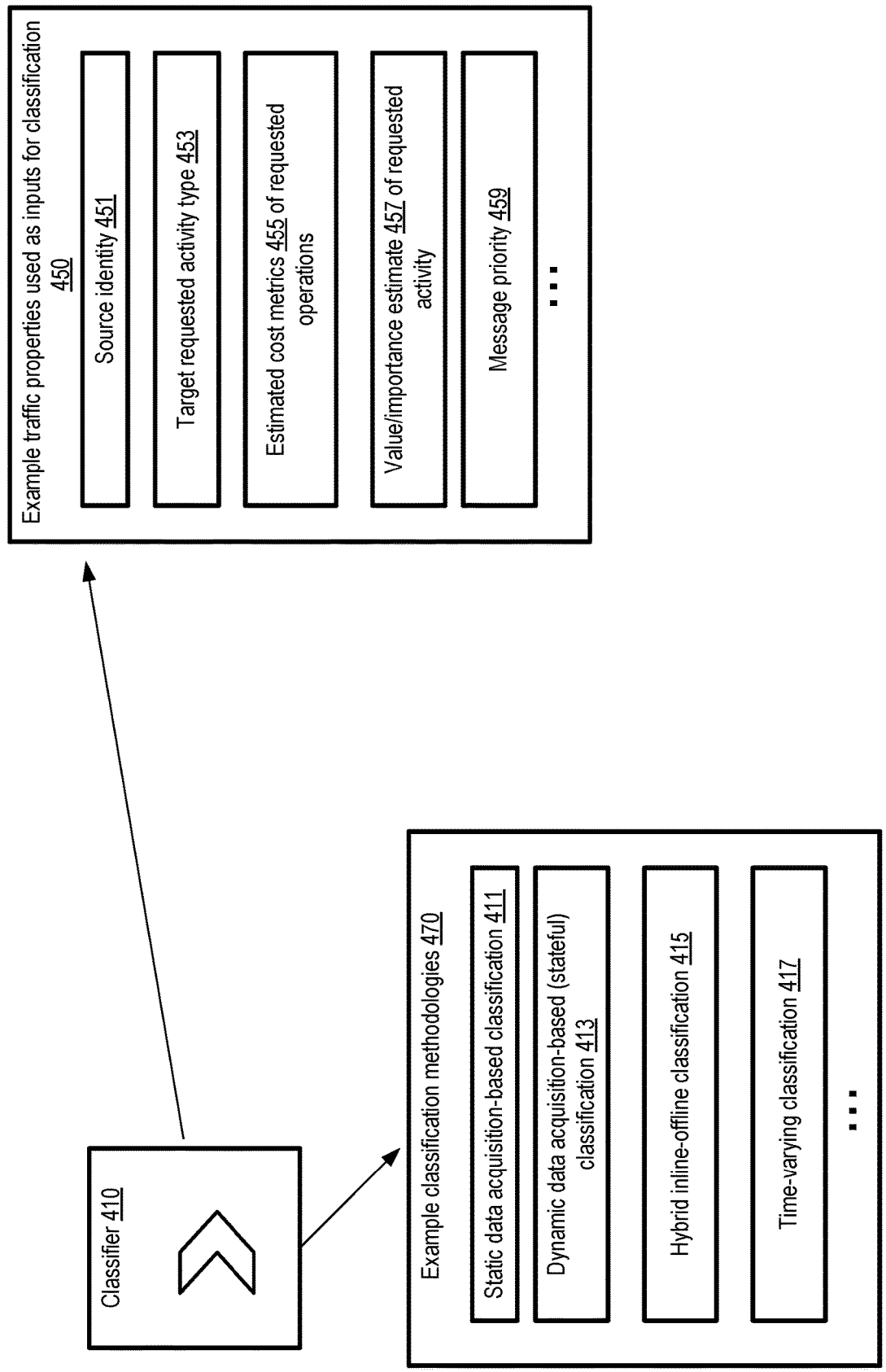
FIG. 4 illustrates example properties of a classifier module that may be used to control network traffic at a distributed system, according to at least some embodiments.

In general, classifier TCMs may be employed in environments in which different types of treatment is to be provided to various subsets of traffic of a distributed system, based on some combination of attributes of the subsets, and not all packets are to be treated the same. FIG. 4 illustrates example properties of a classifier module that may be used to control network traffic at a distributed system, according to at least some embodiments.

A number of different traffic properties 450 may be used individually or in combination as input to the classification algorithm implemented at a classifier TCM 410 in the depicted embodiment. For example, source identity 451 of a message or packet (such as a source IP address, source port, a client account identifier, etc.) may be used to categorize the message. In scenarios in which a given application or service implemented at a distributed system enables its clients to request a variety of different activities (e.g., in the case of an e-retail application, a purchase activity, a return activity, a "search for similar items" query, and so on), the target requested activity type 453 may be used to categorize a message in some embodiments. An estimated cost metric or metrics 455 of the requested operations may serve as a classification input in some embodiments. Several different types of cost metrics may be considered in some embodiments, including for example the resources or time required to complete the requested task, the resources that would be required to abandon the requested task and redo it later, and so on. In some cases, subjective valuations may be assigned to certain types of requested activities associated with a network message, e.g., by the requester, or by a component of the service or application being implemented. For example, a message requesting an air ticket for a flight within the next day may be considered more important according to some criteria than a message requesting an air ticket for a flight six months in the future. Such value/importance estimates 457 may be used to classify messages in some embodiments. In some cases, explicit priorities 459 may be assigned to different messages, e.g., by the submitter or during the processing of the message at some point within the distributed system, and such priority values may be used to classify messages in the depicted embodiment.

Any of a number of different classification methodologies 470 may be employed at the classifier TCMs of a given model in different embodiments. Static data acquisition based classification 411 may be stateless, in that information (such as a source or destination IP address) extracted from a message as it flows through a resource of the distributed system may not need to be retained, compared or processed offline to classify the message. In contrast, dynamic data acquisition-based classification techniques 413 may be stateful, and may take data collected and/or stored over some time period into account. For example, in some embodiments some customers or consumers of a service or application may be categorized as high-frequency consumers or heavy-usage consumers. In order to identify traffic associated with a high-frequency consumer, information about how often request messages are received from various individual consumers over some time period may be retained. Some dynamic data acquisition based classification techniques may consume output from other classifiers—e.g., client identification based classifiers' output may be used in the high-frequency consumer classification example mentioned above.

Hybrid inline-offline classification 415 may include aspects of static data acquisition based classification as well as an offline analysis component in some embodiments. For example, an offline pattern matching algorithm may be employed to classify a collected set of messages or requests, and to generate a rule that can potentially be used to classify subsequent similar traffic. The generated rule may then be implemented at one or more instances of classifiers. Such techniques may be useful, for example, in identifying robot-generated traffic, denial-of-service attack traffic, or other types of undesirable traffic patterns for which specific types of control decisions may be appropriate. In one example scenario, offline analysis algorithms may categorize a sequence of messages originating at some set of traffic sources {S1} as robot-generated, e.g., using pattern matching heuristics or metadata that are not extracted from the messages themselves. A rule that conditionally classifies subsequent messages as robot-generated based on comparing their static source information to {S1} may then be generated and applied in this example of hybrid classification. In some embodiments, time-varying classification methodologies 417 may be implemented—e.g., a packet with a particular set of headers may be assigned to a different category depending on whether the packet is transmitted during business hours in a particular time zone, or in the evening of weekday, or on a weekend or holiday. Classifiers may differ from one another along other dimensions than those indicated in FIG. 4 in at least some embodiments.

In some embodiments, decisions made at one or more other (downstream) TCMs of a model, or actions taken at other TCMs of the model, may be based on the results of the classification algorithms implemented at one or more classifiers. In effect, the classifiers may define the various logical units or streams of traffic (which may be also be referred to as "traffic flows") with respect to which respective further traffic control decisions are to be made, in some cases independently of the decisions made for other logical units. In various embodiments, one or more of a classifier TCM's traffic classification algorithm characteristics or properties may be specified by a TMCS client, e.g., by providing the details regarding the relevant traffic properties and the methodologies to be used for the classifier when creating a model using an interface similar to that shown in FIG. 3. Such metadata pertaining to the classification algorithms to be used by individual classifier TCMs, including for example the specific sources from which classification input is to be obtained, the types of stateless data or state data to be used for classification, offline tools (if any) to be used, and/or the set of classes into which traffic is to be categorized, may be stored in a repository of the TMCS. In some cases, default values may be set for some classifier properties by the TMCS itself.

Example Properties of Flow Change Decider TCMs

Figure 5:
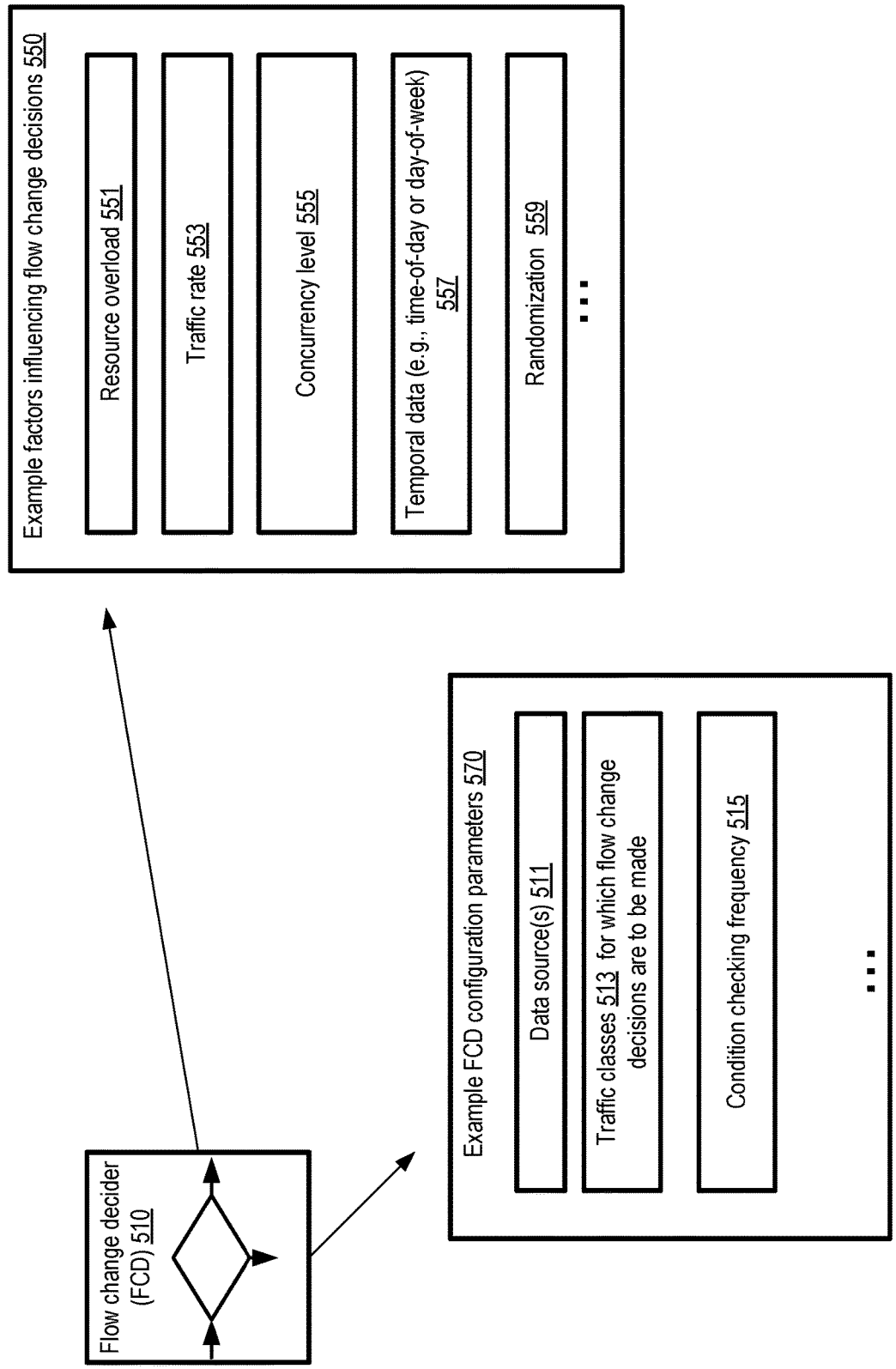
FIG. 5 illustrates example properties of a flow change decider module that may be used to control network traffic at a distributed system, according to at least some embodiments.

FIG. 5 illustrates example properties of a flow change decider module that may be used to control network traffic at a distributed system, according to at least some embodiments. A number of different factors may be taken into account singly or in combination when making flow change decisions at an FCD 510 in the depicted embodiment. Examples 550 of such factors may include resource overloads 551, traffic rate 553, concurrency level 555, temporal data 557, and/or randomization requirements or preferences 559 in different embodiments. Note that as mentioned earlier, the decisions of an FCD may be traffic class-dependent in various embodiments—that is, an FCD may treat flows of messages of different categories (as identified by classifiers) differently.

Apparent, actual, or anticipated overloads 551 at the resource at which a flow change decision is to be made, and/or at downstream or upstream resources with respect to the flow of traffic being analyzed, may be detected using a variety of data sources and tools in different embodiments. The rate 553 at which messages of a given category are flowing (or have been flowing over some time interval) may be used to decide how subsequent packets of the same flow should be treated in some embodiments. The concurrency level 555, e.g., the number of requests generated by a set of customers or users of a given service or application that are being processed concurrently may influence an FCD's decisions in at least some embodiments. Temporal data 557 such as the current time-of-day at which a flow change decision is to be made, or the current day-of-the-week may also influence FCD decisions in at least some embodiments. Temporal data may represent one example of an orthogonal factor, not directly related to or derived from the messages being processed, used for changing traffic flow. In some embodiments, a randomization requirement 559 may be fulfilled at an FCD—e.g., an FCD may be programmed to use a random number to select direct a fraction F1 of an incoming request message stream to a first server set Svr1, a second fraction F2 to a different server set Svr2, and so on.

As may be evident from the discussion of the factors 550 influencing flow change decisions, an FCD TCM may require input data obtained from one or more external sources (i.e., sources that are not part of the traffic control model) in some embodiments. The configuration parameters 570 of an FCD (which may be specified during model creation) may include, among others, data sources 511 from which information about overloads, traffic rates, concurrency levels or the like are to be obtained, as well as the traffic classes 513 for which the decisions are to be made at the FCD. Note that some FCDs may not use traffic class information when making decisions in various embodiments—e.g., all classes of traffic may be treated similarly by a given FCD, or traffic may not be classified at all within a portion of a model. In some embodiments, the frequency 515 at which conditions such as overload, traffic rate, concurrency level or the like are to be checked and the corresponding decisions are to be made may also be specified as a configuration parameter of an FCD. FCD TCMs may differ from one another along other dimensions than those indicated in FIG. 5 in at least some embodiments. In various embodiments, one or more of an FCD TCM's characteristics or properties may be specified by a TMCS client, e.g., when creating a model using an interface similar to that shown in FIG. 3. Such metadata pertaining to the decision algorithms to be used by individual FCD TCMs, including for example parameters and details of an overload detection algorithm, a traffic rate detection algorithm, a traffic concurrency detection algorithm, a flow randomization algorithm, a class of traffic to which the decision algorithms are to be applied (where the class may be determined using classifier TCMs), and/or some other condition to be checked to redistribute traffic, may be stored in a repository of the TMCS. In some cases, default values may be set for some FCD properties by the TMCS itself.

Example Properties of Regulator TCMs

Figure 6:
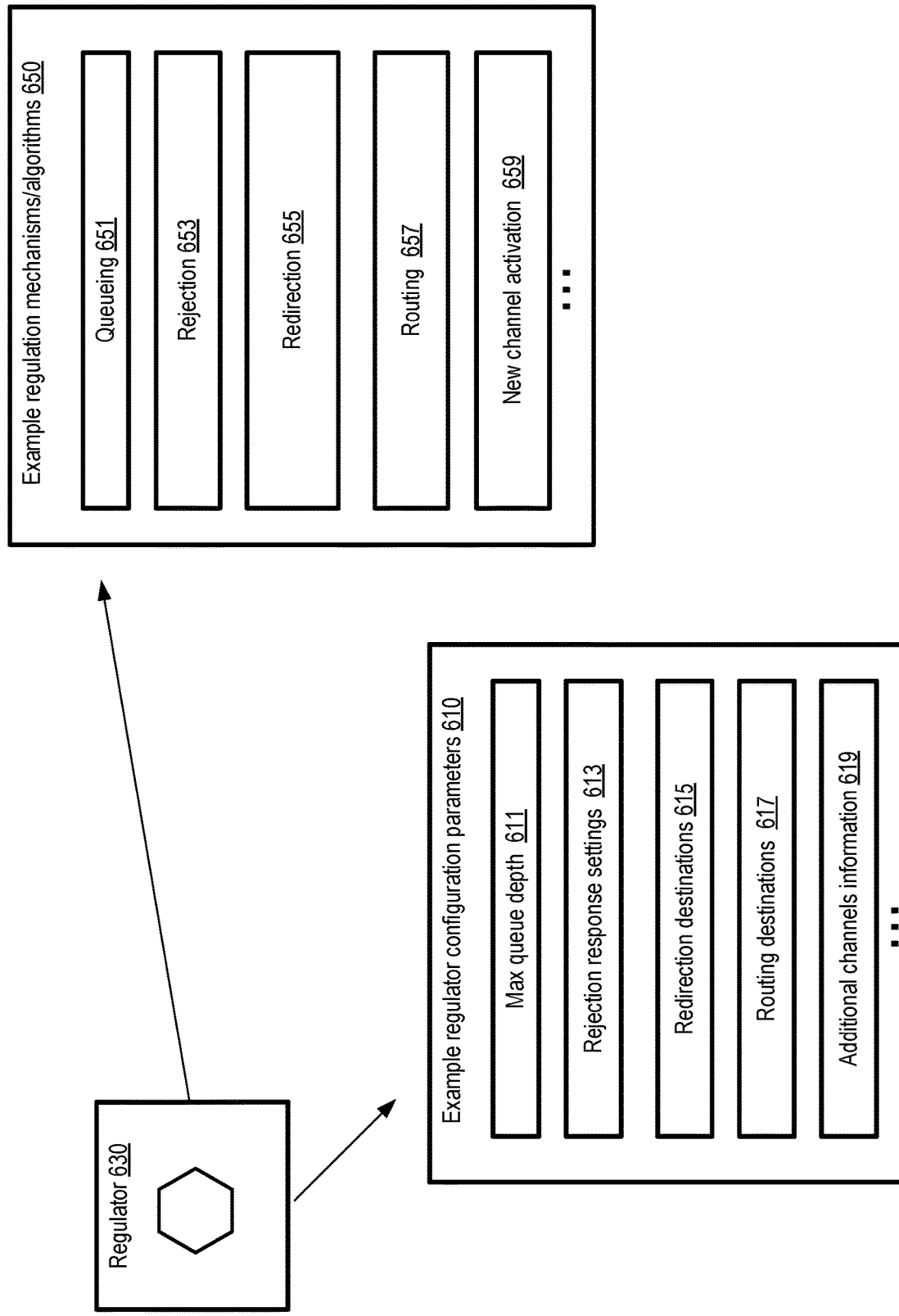
FIG. 6 illustrates example properties of a regulator module that may be used to control network traffic at a distributed system, according to at least some embodiments.

FIG. 6 illustrates example properties of a regulator module that may be used to control network traffic at a distributed system, according to at least some embodiments. As indicated earlier, regulator TCMs of a given traffic control model may indicate the mechanisms used to enforce the decisions reached at corresponding flow change decider (FCD) TCMs. Example regulation mechanisms or algorithms 650, used to implement such decisions made at FCDs, may include queueing 651, rejection 653, redirection 655, routing 657 and/or new channel activation 659 in the depicted embodiment. Queueing 651 may be employed at any of various layers of the hardware/software stack in some embodiments to defer the processing or transmission of network messages between source/destination pairs. Rejection 653 may comprise dropping service requests, one or more packets or messages to reduce the rate of traffic. In some embodiments, a resource which rejects a message or request may transmit an error message to the submitter of the message; in other embodiments, an error message may not be sent. Redirection 655 is a mechanism which may be supported for some types of messages in the depicted embodiment, such as HTTP (HyperText Transfer Protocol) or HTTPs (secure HTTP) requests. An alternate destination address may be provided to the message-submitting client-side program or tool (such as a browser) for redirection, and the client-side program may then re-send the message or request to the alternate destination address.

In an embodiment in which a routing mechanism 657 is employed to change traffic flow, a regulator instance may cause at least a fraction of the messages from a particular source or set of sources to be routed to a different destination. For example, if a pool of four destination servers Svr1, Svr2, Svr3 and Svr4 that are all capable of processing requests of a certain category are available for request messages of type RT1, and approximately 25% of the messages from a set of sources Src1 were being transmitted to each of the four destination servers, a routing regulator may change the fraction of messages to (for example) 40% to Svr1 and 20% to each of the other three servers. In some cases, instead of reducing or slowing down the traffic (as may be accomplished using queueing 651 or rejection 653), a regulator TCM 630 may be employed to add channels or pathways between a set of sources and a set of destinations. For example, an addition destination server Svr5 may be activated or instantiated in the above example, and one or more new persistent TCP (Transmission Control Protocol) connections may be established between source S1 and the additional server Svr5 to handle some of the traffic flowing through the target distributed system in an embodiment in which a regulator implements the new channel activation mechanism 659. A given instance of a regulator may be configured to implement any combination of one or more mechanisms or algorithms.

Configuration parameters for a particular instance of a regulator 630 may of course depend on the specific regulation mechanism or mechanisms being employed. Example configuration parameters 610 used in some embodiments may include for example a maximum queue depth 611 (for the queueing mechanism 651) or rejection response settings 613 (e.g., to indicate whether responses are to be sent to message submitters whose messages are rejected when the rejection mechanism 653 is used, and if so, what the contents of such responses should state). In embodiments in which the routing regulation mechanism 657 is employed, the set of alternative routing destinations 617 may be provided as configuration parameters; similarly, if redirection 655 is to be employed, the redirection destinations 615 may be provided as configuration parameters by a client of a traffic control and modeling service. Additional channels information 619 (e.g., activation instructions for each possible additional channel) may be provided as a configuration parameter in embodiments in which new channel activation regulators 659 are deployed. Other mechanisms and corresponding parameters may be used for regulator TCMs in at least some embodiments than those shown in FIG. 6. In various embodiments, one or more of a regulator TCM's characteristics or properties may be specified by a TMCS client, e.g., when creating a model using an interface similar to that shown in FIG. 3. Such metadata pertaining to the regulation algorithms or mechanisms to be used by individual regulator TCMs, including for example parameters and details of a queueing algorithm, a traffic rejection algorithm, a traffic redirection algorithm, a routing algorithm, and/or a channel activation algorithm may be stored in a repository of the TMCS. In some cases, default values may be set for some regulator properties by the TMCS itself.

Example Properties of Telemetry Recorder TCMs

Figure 7:
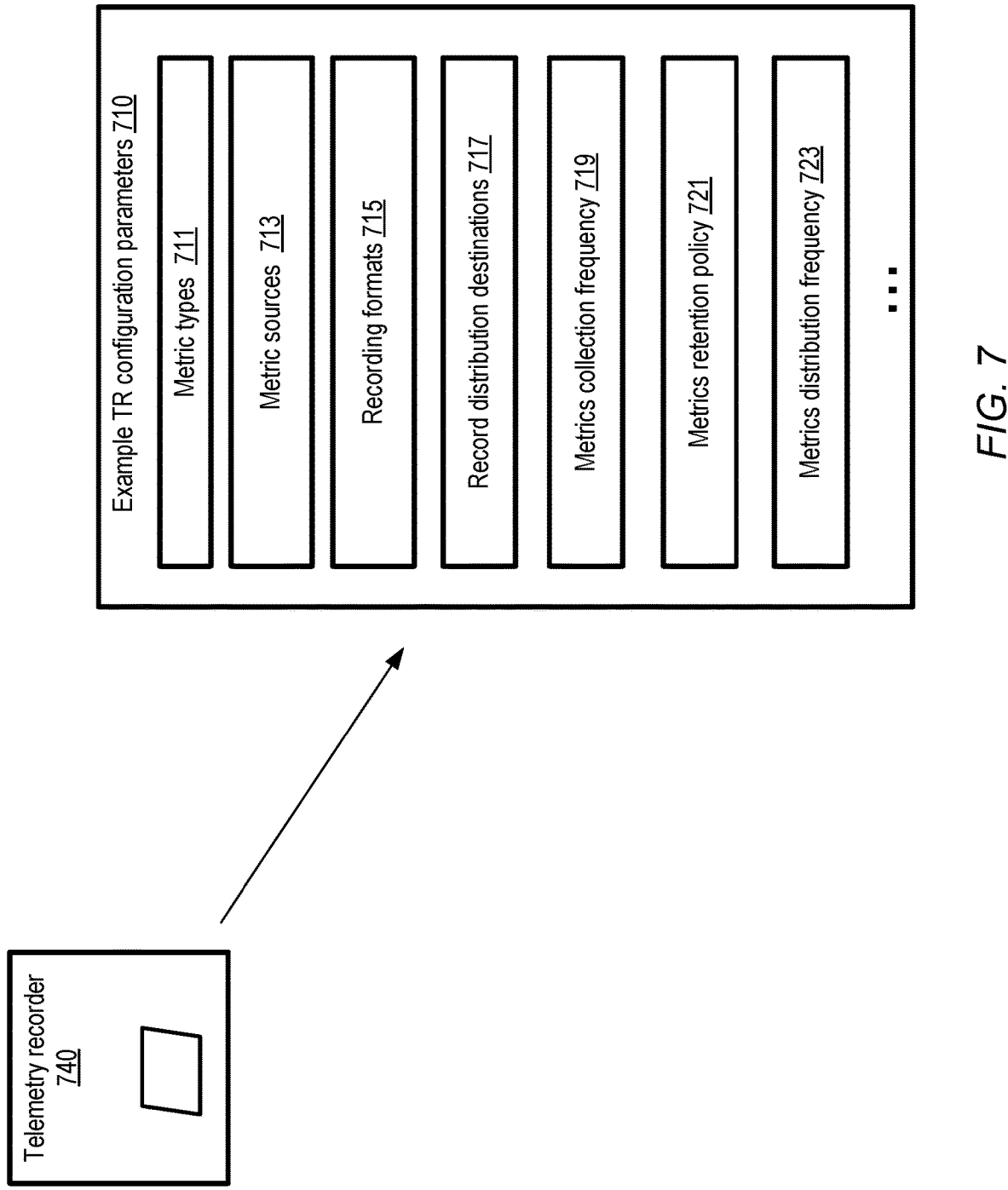
FIG. 7 illustrates example properties of a telemetry recorder module that may be used to control network traffic at a distributed system, according to at least some embodiments.

FIG. 7 illustrates example properties of a telemetry recorder module that may be used to control network traffic at a distributed system, according to at least some embodiments. Example configuration parameters 710 employed in various embodiments for telemetry recorder (TR) TCMs may include the metric types 711 to be collected (e.g., transmitted packets/second, dropped packets/second, megabytes of traffic per second, etc.) as well as the sources 713 (e.g., operating system tools/commands such as the equivalents of "netstat" or the like, network sniffers, custom monitoring tools or modules at various layers of the software/hardware stack etc.) from which the metrics are to be obtained. The formats 715 in which the collected data is to be recorded, and the record distribution destinations 717 (which may include for example FCD TCMs) may also be represented via configuration parameters in at least one embodiment. Collection frequencies 719 for the different metrics to be collected, as well as distribution frequencies 723 may be incorporated among the configuration parameters in various embodiments. A retention policy parameter 721 may be used in some embodiments to indicate how long metrics that are collected at a given instance of a telemetry recorder are to be retained (e.g., for debugging or other purposes). Other parameters than those shown in FIG. 7 may be employed to configure telemetry recorders in some embodiments. In various embodiments, one or more of a telemetry recorder TCM's characteristics or properties may be specified by a TMCS client, e.g., when creating a model using an interface similar to that shown in FIG. 3. Such metadata pertaining to individual telemetry TCMs, including among others the metrics to be collected from a traffic flow (e.g., a sequence of packets that belong to a category identified by a classifier), a report format in which a metric is to be reported, a reporting interval or frequency of a metric, or one or more destinations to which reports of a metric are to be transmitted may be stored in a repository of the TMCS. In some cases, default values may be set for some telemetry recorder properties by the TMCS itself.

Example Stack Layers at which TCMs May be Deployed

Figure 8:
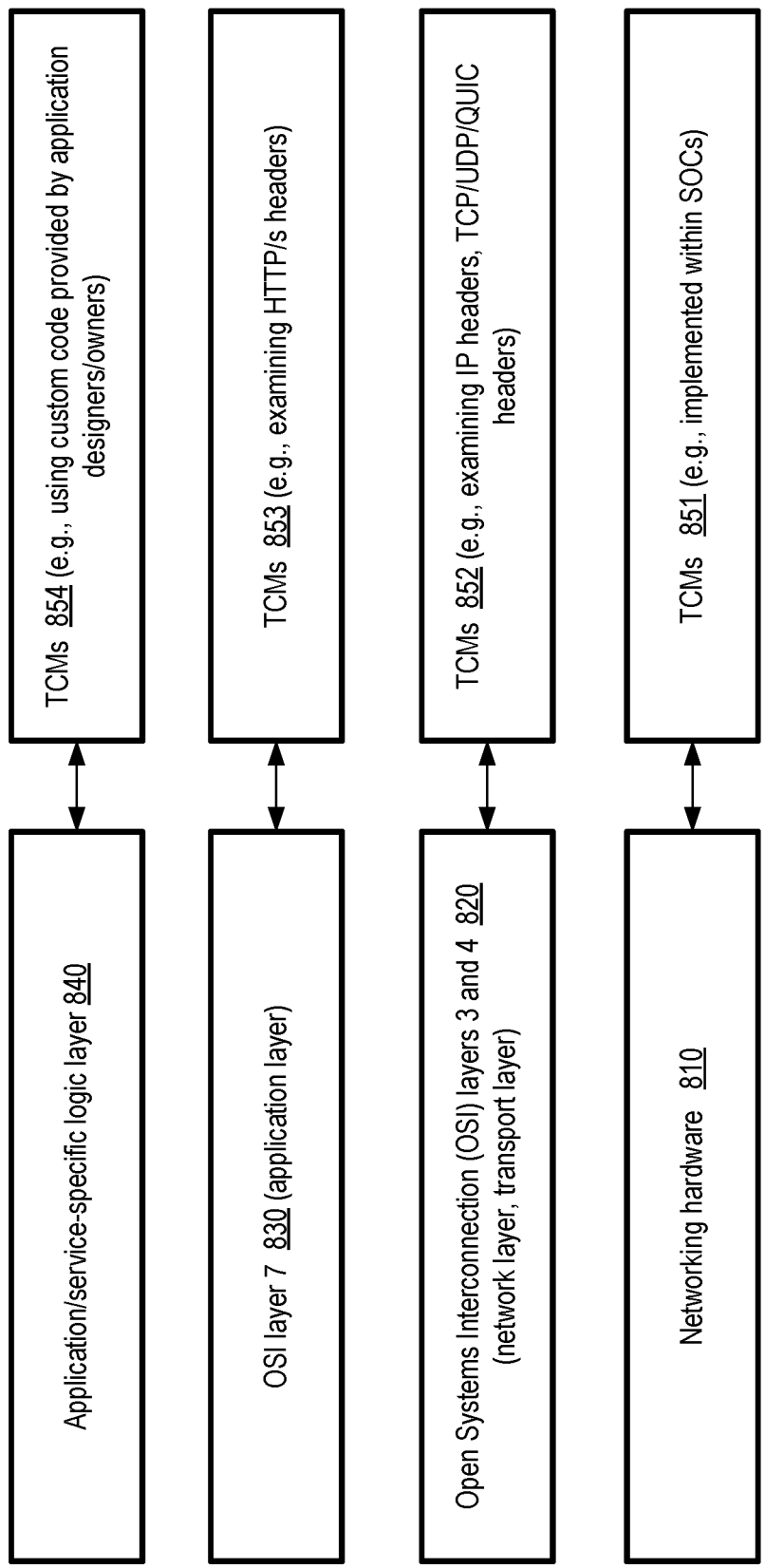
FIG. 8 illustrates example layers of a hardware/software stack at which respective instances of traffic control modules may be deployed, according to at least some embodiments.

Traffic control modules corresponding to the primitives defined in the modeling language of a TMCS similar to TMCS 110 of FIG. 1 may be utilized at various types of computing device components and layers involved in transmitting, receiving or processing network messages in different embodiments. FIG. 8 illustrates example layers of a hardware/software stack at which respective instances of traffic control modules may be deployed, according to at least some embodiments.

In some embodiments, instances 851 of TCMs may be employed at the networking hardware layer 819, e.g., as part of systems-on-chip (SOCs) within networking interface cards, switches, routers and the like. Note that even at the networking hardware layer, at least some of the TCMs 851 may be programmable or dynamically configurable using the kinds of configuration parameters discussed above. Some TCMs 852 may be implemented at layers 3 (the network layer) or 4 (the transport layer) of the OSI model in the depicted embodiment. Such TCMs 852 may, for example, examine or manipulate the contents of IP headers, or the contents of TCP, UDP (User Datagram Protocol), or QUIC (a transport layer protocol designed for low latencies) headers in some embodiments.

Some TCMs 853 may be implemented at OSI layer 7 (the application layer) in at least one embodiment, at which protocols such as HTTP or HTTPs are employed. Any of a number of HTTP headers, or headers defined within layer 7 protocols including BGP (Border Gateway Protocol), DHCP (Dynamic Host Configuration Protocol), IMAP (Internet Message Access Protocol), POP (Post Office Protocol) etc. may be examined or manipulated by TCMs 853. Some TCMs 854 may be implemented at application or service-specific logic layers 840 in one embodiment. Such TCMs 854 may for example require custom code to be provided by application designers/owners or service designers/owners to the TMCS. A service owner may provide plugins or programs representing TCMs 854 that can be programmatically activated or incorporated within the service to implement various types of traffic classification algorithms, flow change decision algorithms and so on in some embodiments. Some individual TCMs may operate at multiple layers of the hardware/software stack in one embodiment. TCMs may be incorporated within stack layers not shown in FIG. 8 in some embodiments.

Example TCM Deployment Techniques

Figure 9:
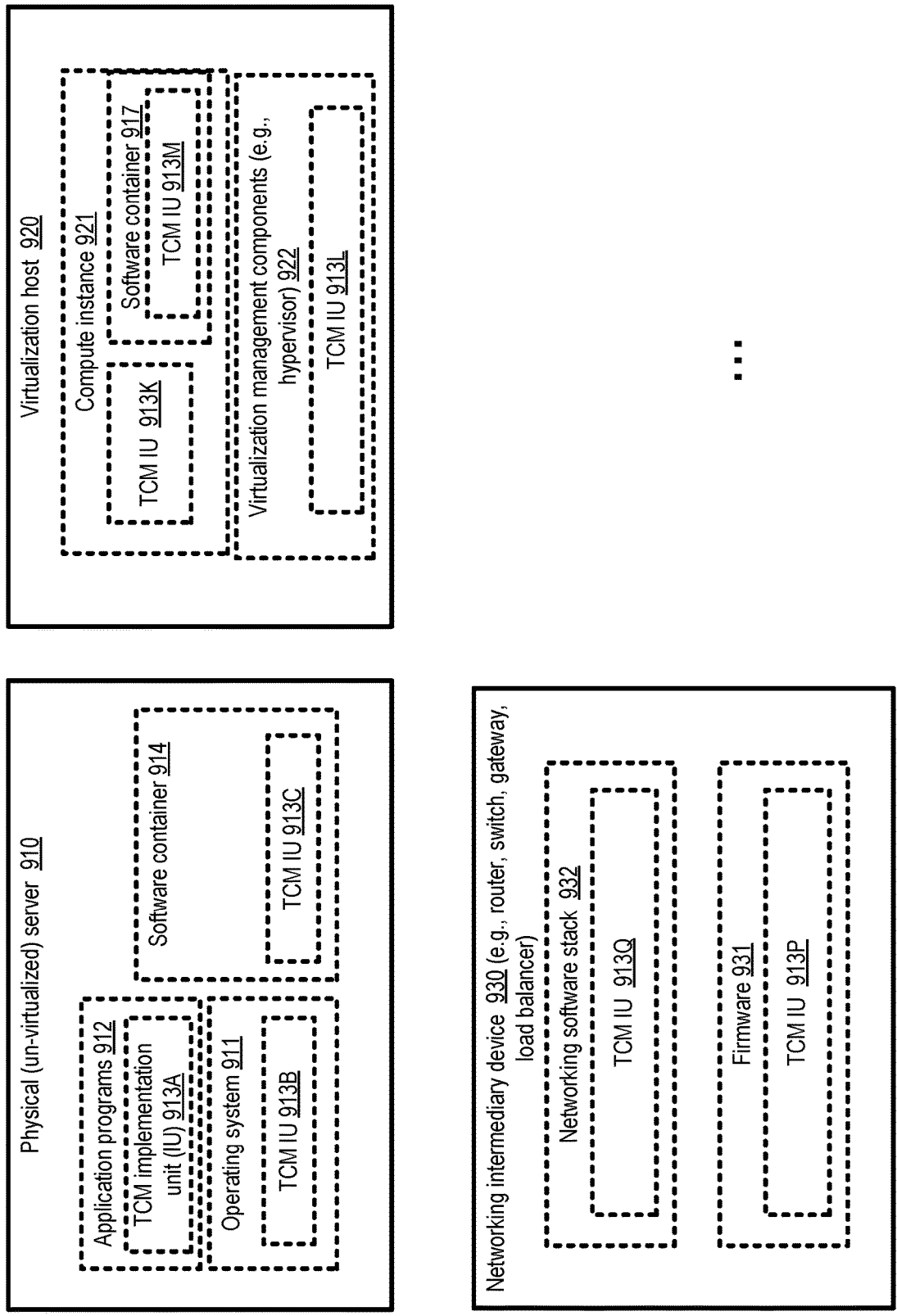
FIG. 9 illustrates example deployment methodologies for executable instances of traffic control modules, according to at least some embodiments.

FIG. 9 illustrates example deployment methodologies for executable instances of traffic control modules, according to at least some embodiments. Three types of devices that may participate in network traffic flows associated with various types of applications or services of a distributed system are shown by way of example in FIG. 9: a physical (un-virtualized) server 910, a virtualization host 920 within which one or more compute instances 921 may be instantiated, and a networking intermediary device 930 such as a router, switch, load balancer, or gateway.

At an un-virtualized server 910, application program(s) 912 may run on top of operating systems 911 in various embodiments. Some TCM implementation units (IUs) such as 913C may be activated within software containers 914, which provide a degree of isolation between the code running at the IUs and the code that is running within the operating system and applications of the server 910. Software containers 914 allow users to run an IU 913C and its dependencies in resource-isolated processes. Containers enable users to easily package a TCM's code, configurations, and dependencies into easy to use building blocks that deliver environmental consistency, operational efficiency, developer productivity, and version control. Containers may help ensure that TCM IUs deploy quickly, reliably, and consistently regardless of deployment environment. Containers may also give the TMCS or its clients more granular control over resources used for TCM IUs, thus potentially improving infrastructure efficiency. Using software containers 914, which can be activated and deactivated independently of the other software running on the server 910, and cannot direct access memory being used for the applications or operating system, may be referred to as a "sidecar" methodology in some embodiments. Some TCM IUs such as 913A may be run as, or within, application programs 912 in various embodiments. Other TCM IUs such as 913B may be run as part of the operating system 911.

At a virtualization host 920, e.g., at a computing service of a cloud computing environment, one or more compute instances 921 (such as respective guest virtual machines) may be configured to run applications or services implemented at a distributed system in various embodiments. Some TCM IUs such as 913K may be instantiated or activated within compute instances in one embodiment. In some embodiments, software containers 917 may be established within compute instances 921, and one or more TCM IUs 913M may be configured within such software containers. In at least one embodiment, some TCM IUs 913L may be configured within virtualization management components 922, such as hypervisors or administrative operating system instances, of a virtualization host 920.

According to one embodiment, some TCM IUs such as 913P may be implemented using firmware 931 at a networking intermediary device 930. I other embodiments, one or more TCM IUs 913Q may be incorporated within a networking software stack 932 of the networking intermediary device. In various embodiments, clients of a TMCS similar to TMCS 110 of FIG. 1 may specify the particular deployment methodologies or options for individual ones of the IUs to be used at a given target distributed system. Note that in some embodiments, TCM IUs may be utilized at several or all of the deployment options illustrated in FIG. 9 concurrently within a given distributed system. In one embodiment, some or all of the deployment options shown in FIG. 9 may not be employed.

Example Programmatic Interactions Associated with Modeling Traffic Control

Figure 10:
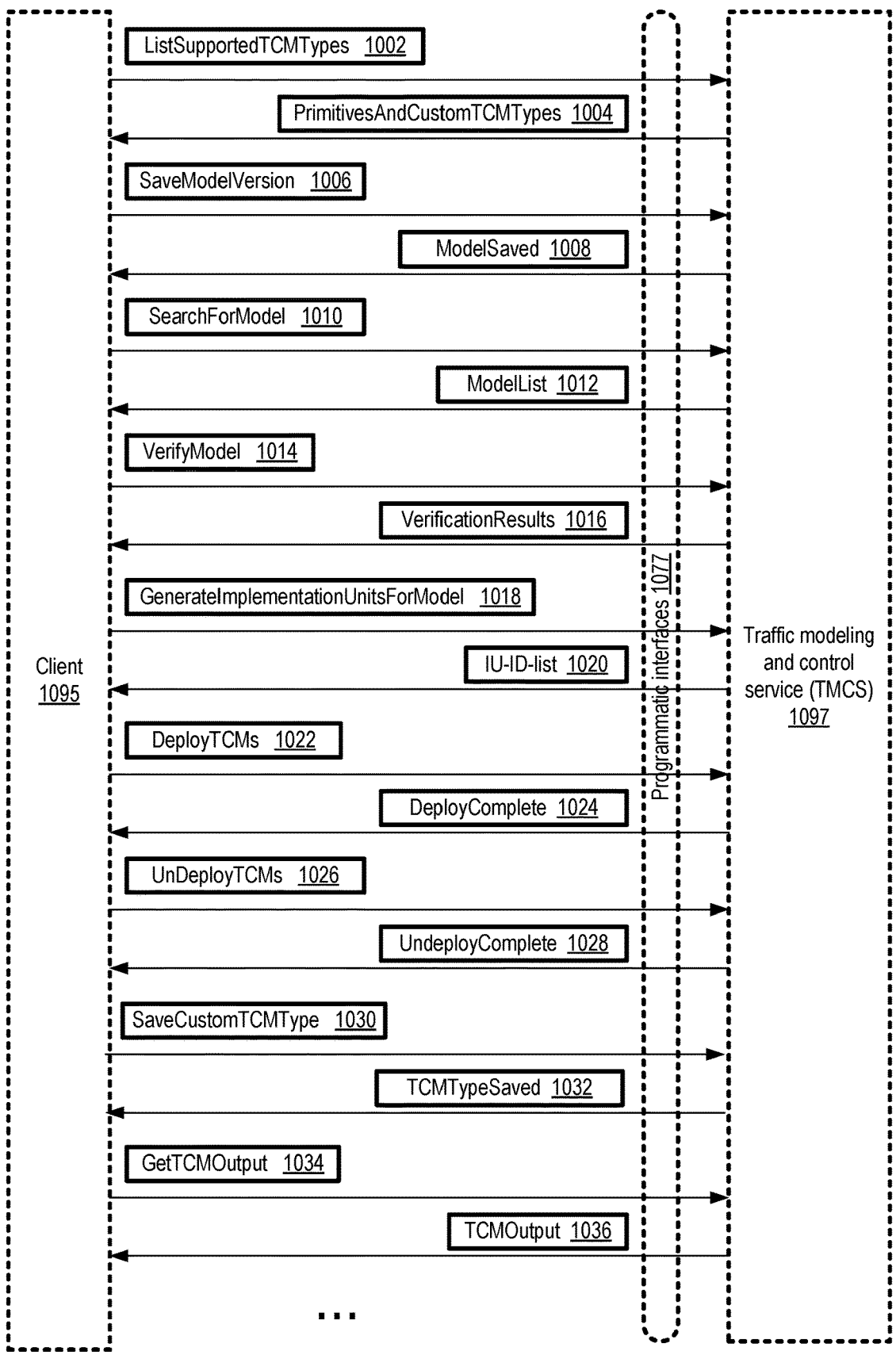
FIG. 10 illustrates example programmatic interactions associated with network traffic modeling and control of a distributed system, according to at least some embodiments.

FIG. 10 illustrates example programmatic interactions associated with network traffic modeling and control of a distributed system, according to at least some embodiments. A traffic modeling and control service (TMCS) 1097, similar in features and functionality to TMCS 110 of FIG. 1, may implement a set of programmatic interfaces 1077 which can be used by clients 1095 to submit various types of requests and receive corresponding responses in the depicted embodiment. The interfaces 1077 may include, for example, web-based consoles or model development environment front-ends, graphical user interfaces, application programming interfaces (APIs), command line tools and the like in different embodiments.

Using interfaces 1077, a client 1095 may for example submit a ListSupportedTCMTypes request 1002 to determine the different kinds of traffic control module primitives supported by the TMCS's modeling language in the depicted embodiment, as well as any non-primitive or custom traffic control module (TCM) types. A collection of the available primitives (e.g., classifiers, flow change deciders, regulators, telemetry recorders, aggregators, etc.) and custom TCM types to which the client has access, and which can therefore be included among traffic models of distributed systems by the client, may be provided in some embodiments via one or more PrimitivesAndCustomTCMTypes messages 1004.

The client may develop a traffic control model of a distributed system, e.g., in the form of a graph whose nodes represent respective TCM instances, and whose edges represent the logical flow of traffic control-related information among the TCM instances in the depicted embodiment. In some embodiments, a graphical interface similar to that depicted in FIG. 3 may be used. In other embodiments, a client 1095 may not necessarily use a graphical front-end tool or interface to construct a model; instead, for example, a client may specify the TCM instances and their interconnections using JSON, XML, and/or other markup or scripting languages. In response to a SaveModelVersion request 1006 submitted by the client, a representation of the traffic model may be stored in a repository of the TMCS 1097 in some embodiments, and a ModelSaved response 1008 may be transmitted back to the client via the programmatic interfaces 1077. In various embodiments, clients 1095 may indicate user-defined names for their models.

In some embodiments, the TMCS 1097 may support a search query interface, which can be used by clients to determine whether a pre-existing model that satisfies (or comes close to satisfying) client-specified criteria is available for viewing or copying. A SearchForModel request 1010 indicating one or more search criteria may be submitted to the TMCS in such embodiments, and a list of models that match the criteria may be provided in a ModelList response 1012. The search criteria may include, for example, model names, the name or identifier of a model creator or owner, the name or identifier of a particular target distributed system which a model represents (or to which implementation units of the model have been deployed), properties of model TCMs (e.g., similar to the properties discussed earlier in the context of FIG. 4-FIG. 7), the number of TCMs in a model, and so on. In some embodiments, a client 1095 may indicate whether exact matches are required, or whether the TMCS should provide a list of models that satisfy the search criteria partially. In other embodiments, if an exact match is not found, the TMCS 1097 may by default return models that are identified as the closest matches for the specified search criteria.

In some embodiments, a client 1095 may optionally request that one or more types of verification operations be implemented on a given version of a given model, e.g., using a VerifyModel request 1014. For example, the TMCS may check that a given version of a model does not include any unreachable TCMs, that the type of data consumed at each TCM instance included in the model corresponds to the type of data produced at an upstream TCM or other data source, and so on. Such verification operations may be considered analogous to checking the syntax of the source code of a computer program, with the model corresponding to the computer program in the analogy. In response, the TMCS 1097 may provide a set of verification results in a VerificationResults message 1016.

In at least one embodiment, a client 1095 may utilize a TMCS 1095 to obtain deployable and/or executable implementations of various TCMs of a model. A GenerateImplementationUnitsForModel request 1018 may be submitted to the TMCS 1097, indicating a model for whose TCMs respective implementation units (IUs) are to be prepared at the TMCS in the depicted embodiment. In at least some embodiments, the representation of the model whose IUs are to be produced/generated (which may already be stored in a TMCS repository) may include the details of the parameters and methodologies to be used for the individual TCMs of the model; such details may for example have been specified earlier by the client. In at least some embodiments, some implementation details may be left to the TMCS itself—for example, a client 1095 may not necessarily specify exactly which tool is to be used to capture a particular metric at a telemetry recorder IU, or exactly how much memory for a queueing regulator's IU is to be allocated. If the TCM has insufficient information to generate an IU for a given TCM, in some embodiments the TMCS may request additional details from the client. After the requested IUs corresponding to a given model have been generated, a list of identifiers of the IUs may be provided by the TMCS in some embodiments, e.g., in an IU-ID-List response 1020. The generation of IUs may be considered analogous to generating executable code for a program, where the model represents the program source code in the analogy. Note that not all the implementation units of a model may necessarily be generated at the TMCS in some embodiments. For example, the client may provide some or all TCM implementation units (e.g., software containers, virtual machine images, other executable programs or the like) for a distributed system in one embodiment.

A DeployTCMs request 1022 may be submitted by a client 1095 to a TMCS 1097 in some embodiments, indicating target resources within a distributed system at which specified TCM IUs are to be deployed or activated. In response, the requested deployment and/or activation operations may be initiated by the TMCS, and a DeployComplete message 1024 may be sent to the requester in some embodiments if the deployments succeed. To stop the operations of one or more TCMs, a client 1095 may submit an UnDeployTCMs request 1026 in some embodiments. In response, the TMCS may terminate the operations of the specified TCMs at the resources where they were running, and transmit an UndeployComplete message 1028 to the client.

In at least some embodiments, as indicated earlier, a client 1095 of a TMCS may generate customized TCM types, e.g., by extending the functionality of one or more of the primitives discussed earlier, or by designing/developing a new type of TCM that is not derived from an existing primitive. A SaveCustomTCMType request 1030 indicating the name and properties of such a custom TCM type may be submitted programmatically to the TMCS in such embodiments. The TMCS 1097 may save information provided by the client, including for example a graphical symbol representing the new TCM type, various properties and other details that may be required to implement instances of the new TCM type, and make the new TCM type available for use as part of traffic models to at least some clients in at least some embodiments. A TCMTypeSaved message 1032 may be sent to the client on whose behalf the custom TCM type was created in some embodiments.

According to some embodiments, a client 1095 may submit GetTCMOutput requests 1034 to obtain representations of the output generated at specified TCMs deployed/activated at a distributed system. Such output may include, for example, metrics recorded at various telemetry recorder IUs, at least some of which may indicate the results of flow change decisions made at FCD IUs and implemented by regulator IUs for various classes of traffic identified by classifier IUs. In one embodiment, the output for one or more TCM IUs may be obtained for debugging or analysis purposes. In various embodiments, programmatic requests other than those shown in FIG. 10 may be employed to configure and utilize traffic control models.

Example System Environment with Multi-Service Network Traffic Controllers (MNTCs)

Figure 11:
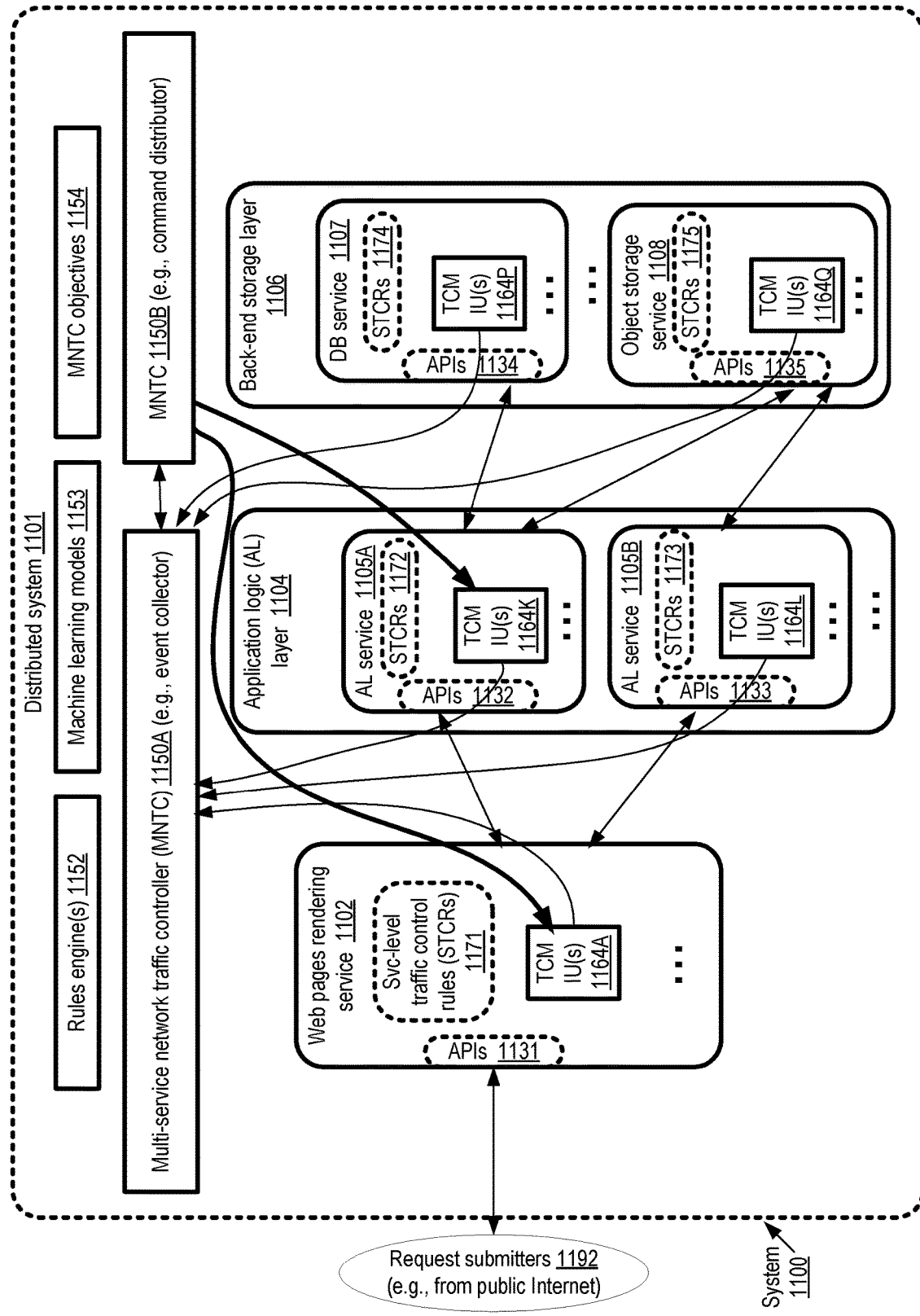
FIG. 11 illustrates an example system environment in which multi-service network traffic controllers may be implemented, according to at least some embodiments.

FIG. 11 illustrates an example system environment in which multi-service network traffic controllers may be implemented, according to at least some embodiments. As shown, system 1100 comprises various resources of a plurality of services that collectively implement an application for which requests are received from customers or submitters 1192 (e.g., from the public Internet), including a web pages rendering service 1102, application logic (AL) services 1105A and 1105B of an AL layer 1104, and database service 1107 and object storage service 1108 of back-end storage layer 1106. The rendering services 1102 may be responsible for generating the parts of a web page to be presented to a request submitter, for example. The application logic layer 1104 may be responsible for implementing the internal computations performed to respond to various requests, while the back-end storage layer may be used to maintain persistent records of transactions completed (and/or artifacts generated) as a result of the computations of the AL layer. The example multi-layer architecture depicted in FIG. 11 may be implemented for any of a variety of applications in different embodiments, such as for example an Internet-scale e-retailing application, various types of content management and distribution applications, and so on.

Individual ones of the services shown in FIG. 1 may be implemented using respective sets of resources in the depicted embodiment. For example, a different set of computing devices may be employed for the rendering service 1102 than is used for the application layer 1104 or the storage layer 1106. Such a strategy of separated or isolated implementation may have a number of advantages—e.g., different employee teams with respective skill sets may be dedicated to each service, the development of the individual services may proceed independently of other services, and so on. Each of the services may implement a respective set of application programming interfaces (APIs) in the depicted embodiment, such as APIs 1131 of rendering service 1102, APIs 1132 of AL service 1105A, APIs 1133 or AL service 1105B, APIs 1134 of database service 1107, and APIs 1135 of object storage service 1108. During a given instance of a multi-service dataflow or task, respective APIs of different services may be invoked in the depicted embodiment. For example, APIs 1131 may be invoked by request submitters 1192, APIs 1132 may be invoked from resources of the rendering service 1102, APIs 1134 of the database service 1107 may be invoked from resources of the AL service 1105A, while APIs 1135 of the subject storage service 1108 may be invoked from resources of both AL services 1105A and 1105B in the depicted embodiment.

In some embodiments, individual ones of the services of system 1100 may have respective service-level traffic control rules (STCRs). For example, at least some traffic control decisions applicable to the resources of rendering service 1102 may be determined according to STCRs 1171, at least some traffic control decisions for resources of AL service 1105A may be determined according to STCRs 1172, and so on, with STCRs 1173, 1174 and 1175 being employed locally at services 1105B, 1107 and 1108 respectively. In some embodiments, individual ones of the services may comprise respective service-level traffic controllers that enforce the local STCRs.

In the depicted embodiment, one or more multi-service network traffic controllers (MNTCs) 1150 (e.g., 1150A and 1150B) may be established to implement traffic management policies for tasks that involve network traffic flowing among a plurality of the services. Such MNTCs 150 may be configured to enable a holistic or system-wide approach towards network traffic modeling and management, which may not be feasible with the independently designed and implemented STCRs alone in some embodiments. Using a modeling language and methodology similar to that discussed earlier (e.g., in the context of FIG. 1 through FIG. 10), traffic control models for the various services may be generated and stored in the depicted embodiment. Implementation units (IUs) corresponding to various traffic control modules (TCMs) (e.g., classifiers, flow change deciders, regulators, etc.) may deployed and/or activated at various resources of the different services. For example, TCM IUs 1164A may be activated within rendering service 1102A, TCM IUs 1164K may be activated at AL service 1105A, TCM IUs 1164L may be activated at AL service 1105B, TCM IUs 1164P may be activated at database service 1107, and TCM IUs 1164Q may be activated at object storage service 1164Q.

In the depicted embodiment, MNTC 1150A may be designated as an event collector with respect to the TCM IUs of several services, while MNTC 1150B may be designated as the command distributor with respect to TCM IUs of at least some services. For example, at least a subset of IUs at services 1102, 1105A, 1105B, 1107 and 1108 may provide network traffic data and/or metadata, obtained at the respective services, to the MNTC 1150A. A number of techniques may be employed at the MNTCs to process and analyze the collected traffic data and metadata in different embodiments. For example, a combination of one or more rules engines 1152 and/or machine learning models 1153 may be employed in some embodiments to identify any changes that should be implemented with regard to the traffic flowing at the services. In at least some embodiments, a set of system-wide target objectives 1154 may be communicated via programmatic interfaces to the MNTCs, and the rules engines 1152 and/or machine learning models 1153 may scrutinize the collected data with the goal of meting such objectives. Examples of objectives 1154 may for example include response time targets for various multi-service data flows corresponding to requests from submitters 1192, overall system availability for such data flows, resource utilization level goals for the resources employed at the different services, and so on.

Based on the analysis of the collected data, MNTC 1150B may transmit various commands to TCM IUs 1164 at one or more of the services of system 1100 in the depicted embodiment. Such commands may include, for example, directives to change TCM parameter values, e.g., to route 70% of the packets generated at a particular resource of a particular service to a destination resource DR1 instead of 60% of the packets, to change a permitted message flow rate, to change a message prioritization rule, to change routing destinations, or to change a maximum queue depth for messages. Other types of commands may indicate, for example, that a new classification algorithm is to be implemented at an IU, or that a new type of overload detection scheme is to be utilized at a given IU. In at least some cases, because of the higher-level data accessible to the MNTCs, the commands issued by the MNTC 1150B may result in operations that would not have been performed if only the local STCRs were enforced. For example, data collected at a downstream service such as DB service 1107 may be used to change parameters at the rendering service 1102 or an AL service 1105. As a result of the commands issued by the MNTC 1150B, the flow of network traffic at one or more points within system 1100 may be changed in various embodiments. Indications of such changes to network traffic that result from MNTC decisions may be presented, e.g., via dashboards or other programmatic interfaces, to one or more destinations or recipients in various embodiments.

Example Hierarchy of MNTCs

Figure 12:
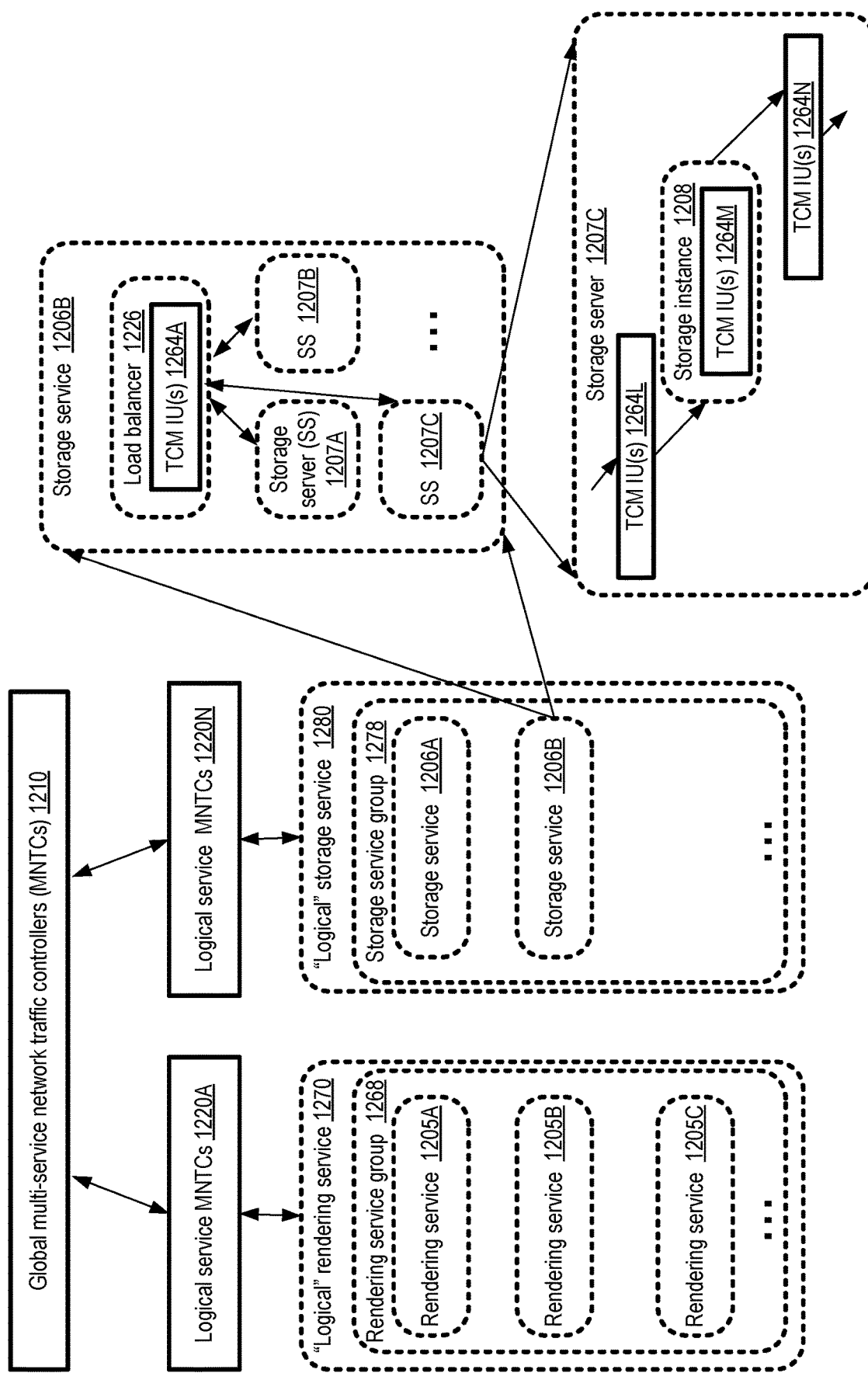
FIG. 12 illustrates an example of a hierarchy of multi-service network traffic controllers, according to at least some embodiments.

In some embodiments, traffic control models of the kind discussed earlier may be employed for large and complex multi-service distributed environments, with network traffic flowing through tens of thousands or hundreds of thousands of individual resources. In at least some such environments, traffic management operations may be managed hierarchically, with similar services being grouped into higher-level "logical" services and with several layers of multi-service network traffic controllers. FIG. 12 illustrates an example of a hierarchy of multi-service network traffic controllers, according to at least some embodiments. In the depicted embodiment, a plurality of different rendering-related services, such as rendering service 1205A, 1205B and 1205C of a multi-layer web-based application may be identified as having similar functionality, and may therefore be designated as members of a rendering service group 1268 which is to be represented as a single "logical" rendering service 1270 for the purposes of modeling. Similarly, several different back end storage-related services of the same multi-layer application, including storage service 1206A and storage service 1206B may be designated as members of storage service group 1278, for which a single "logical" storage service 1280 may be employed for modeling purposes.

In some embodiments, an MNTC may obtain metadata pertaining to a plurality of services and group the services based on results of metadata similarity analysis. For example, such metadata may include the APIs supported at individual ones of the services 1205 and 1206, the sources from which API requests are received at each service, the destinations to which results are sent from the individual services, and so on. In some embodiments, an MNTC may be granted access to metadata repositories and/or log records associated with individual ones of the services 1205 and 1206, and the metadata may be extracted from such repositories. In other embodiments, at least a portion of the metadata may be provided to the MNTCs by clients on whose behalf the MNTCs are established. The metadata may be analyzed to identify similarities in functionality, traffic request-response patterns or other properties/behaviors of the different services, and the services may be classified into groups 1268 and 1278 based on the results of such similarity analysis. Summarized representations of the combination of services whose metadata was analyzed may be generated in various embodiments, in which a group of similar services is replaced by an aggregated logical service such as service 1270 or 1280. In one embodiment, a high-level traffic control model (at least a portion of which may for example be auto-generated at an MNTC based on similarity analysis) of the distributed system may include such aggregated logical services. In some embodiments, an indication of the logical services may be provided to a client (e.g., to obtain programmatic approval of the logical aggregation that was performed). Note that the aggregated services of a given service group may differ from one another along some dimensions in various embodiments. For example, somewhat different sets of APIs may be supported, for rendering respective portions of web pages, at the rendering service 1205A than are supported at rendering service 1205B. Similarly, it may be the case that the types of storage devices or data models used for persistent storage objects may differ at service 1206A from the types of storage devices or data models used at service 1206B.

A respective set of one or more multi-service network traffic controller (MNTCs) may be established for each of the aggregated logical services in some embodiments. For example, logical service MNTCs 1220A may be established for the group of similar services collectively represented by logical rendering service 1270 in the depicted embodiment, and logical service MNTCs 1220N may be established for the group of services collectively represented by the logical storage service 1280. Each of the logical service MNTCs may obtain data generated at traffic control module (TCM) implementation units (IUs) deployed/activated at various resources or locations within individual services of their service groups. Such data may be aggregated at the logical service MNTCs, and passed on to higher level MNTCs such as one or more global MNTCs 1210. At the global MNTCs 1210, aggregated traffic data from individual ones of the logical service MNTCs 1220 may be analyzed in the depicted embodiment, and decisions regarding configuration changes to be made at the TCM IUs of various ones of the logical services may be made based on the analysis. A given distributed system may be modeled as a multi-layer aggregation of logical services in some embodiments—e.g., one group of services represented by a logical service may in turn comprise various groups of lower-level services, with each lower-level service also represented by a respective logical service.

Within a given lower-level service 1205 or 1206, TCM IUs may be deployed at multiple levels of the resource hierarchy in at least some embodiments. For example, the resources of storage service 1206B may include a load balancer 1226A which is configured to distribute storage workload requests among storage servers 1207A, 1207B and 1206C. Individual ones of the storage servers 1207 may in turn comprise a storage instance 1208 (e.g., a database, a named collection of unstructured storage objects, a logical volume, or the like). In the depicted example scenario, respective TCM IUs may be deployed/activated at, among others, the following locations or resources: at the load balancer (IUs 1264A), at a storage instance 1207 (IUs 1264M), upstream of the storage instance (IUs 1264L) and/or downstream of the storage instance (IUs 1264N). Note that, in at least some embodiments, from a modeling perspective a TCM IU may be placed along segments of a network path (e.g., TCM IUs 1264L are shown on a segment of a path leading to storage instance 1208, and TCM IUs 1264N are shown on a segment of a path leading from storage instance 1208). Depending on the details of implementation of the IU, the work done at a given IU which is modeled along a segment path may be performed for example at a resource at which the segment originates, at s resource at which the segment terminates, or at a network component (e.g., a network cable) representing the segment itself.

Example Graphical Interface for MNTCs

Figure 13:
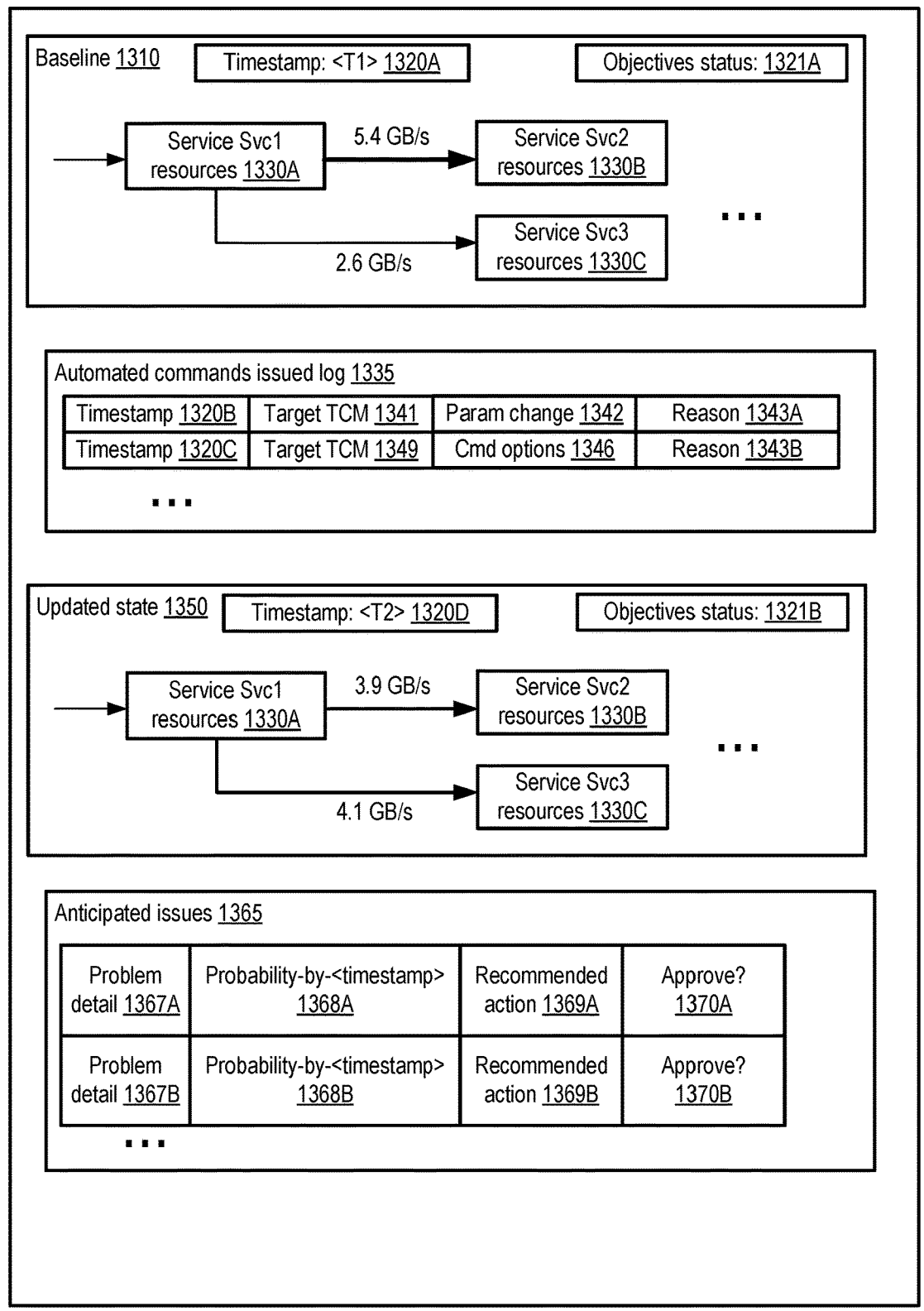
FIG. 13 illustrates an example of a graphical interface which may be used to display information pertaining to multi-service network traffic controllers, according to at least some embodiments.

FIG. 13 illustrates an example of a graphical interface which may be used to display information pertaining to multi-service network traffic controllers, according to at least some embodiments. In the depicted embodiment, a graphical interface 1302, which may be displayed via a web page or a standalone graphical tool, may show several different types of information about a collection of services for which one or more MNTCs have been configured. For example, the impact of commands issued from an MNTC on the overall flow of traffic between various services may be displayed using a pair of status information regions of the interface: a baseline state region 1310 and an updated state region 1350. In the baseline state region 1310, an overview of traffic information associated with three connected services are shown: Svc1 1330A, Svc2 1330B and Svc3 1330C, as of a timestamp 1320A. At a time <T1> corresponding to timestamp 1320A, baseline region 1310A indicates that traffic was detected flowing at a rate of 5.4 GB/sec between resources of Svc1 and resources of Svc2, and at a rate of 2.6 GB/sec between resources of Svc1 and resources of Svc3.

The state of overall objectives of the multi-service distributed system comprising resources of Svc1, Svc2 and Svc3 as of timestamp <T1> (e.g., overall availability, resource utilization levels and the like) may be displayed in element 1321A of the baseline region in the depicted example scenario.

In the updated state region 1350, the status of the same distributed system at a timestamp 1320D may be displayed. Timestamp T2 may indicate a later time than T1, and a set of automated commands may have been issued between T1 and T2, resulting in changes to the traffic of the distributed system. A command issued log region 1335 may indicate the set of commands that were issued in the depicted example scenario, including the respective timestamps (e.g., 1320B and 1320C) at which the automated commands were issued by an MNTC, the target TCMs to whose implementation units which the commands were issued (e.g., TCMs 1341 and 1349), and/or the details of the respective commands (such as parameter change 1342 or command and options 1346). In at least one embodiment, the TMCS or MNTC may also provide an indication of the reasoning or justification for at least some of the issued commands, e.g., in reason fields 1343A or 1343B. Note that in some embodiments, before issuing at least some commands to a TCM IU, an MNTC may provide an indication of the particular proposed command (e.g., a proposed TCM parameter change) to a client on whose behalf the traffic of the distributed service is being managed, in effect requesting an approval of the proposed command. In such embodiments, programmatic approval of a command may be required before the command is issued from the MNTC.

In the updated state region 1350, the traffic rates between Svc1 and the other two services have changed relative to the baseline in the depicted embodiment. For example, the traffic rate (as of timestamp T2) between Svc1 and Svc2 resources is now 3.9 GB/sec (instead of 5.4 GB/sec at timestamp T1), and the traffic rate between Svc1 and Svc3 is now 4.1 GB/sec (instead of 2.6 GB/sec). The interface 1302 may suggest to a client that the change in traffic distribution was (at least with some probability) caused by one or more of the automated commands indicated on the log 1335.

In at least some embodiments, an MNTC may perform some level of proactive analysis, made possible by the system-wide traffic data provide to the MNTC. For example, in the depicted embodiment, the MNTC may examine the data collected at various services, as well as trends in similar data collected earlier from the same services or similar services, and identify a set of possible future problems (e.g., severe resource overloads leading to service outages, possible failures of hardware/software components) and the times at which such problems are likely to become more severe unless they are addressed in advance. An anticipated issues region 1365 of the interface 1302 may be used to present such information, including for example a respective program detail element 1367 for each of the identified issues/problems (1367A or 1367B) and an estimated probability 1368 (e.g., 1368A or 1368B) that the problem will become severe by a particular timestamp. Recommended actions 1369 (e.g., 1369A or 1369B) which could be initiated by the MNTC, such as TCM configuration setting changes or other MNTC-issued commands, which could potentially reduce the probabilities of occurrence of the problem states may be indicated via interface 1302 in some embodiments. Interface elements which can be used by the client to approve such changes, such as elements 1370A or 1370B may also be included in interface 1302 in some embodiments. In at least one embodiment, machine learning models (e.g., similar to models 1153 discussed in the context of FIG. 11) may be used to identify the issues for which information is displayed in region 1365, and/or to identify the recommended changes. Other types of elements than those shown in FIG. 13 (or other arrangements of elements similar to those shown in FIG. 13) may be incorporated within graphical MNTC interfaces in at least some embodiments.

Example Programmatic Interactions Associated with MNTCs

Figure 14:
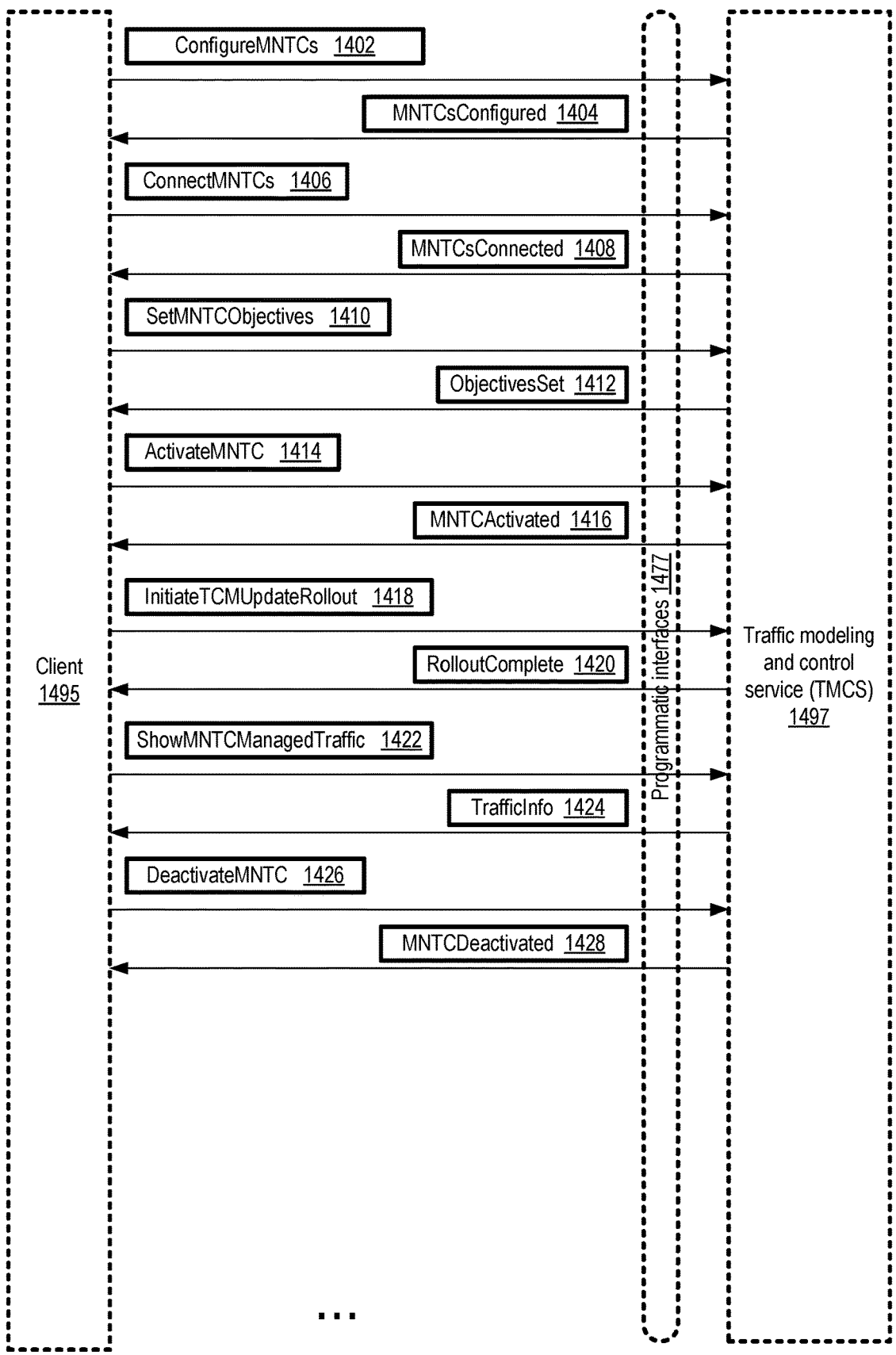
FIG. 14 illustrates example programmatic interactions associated with multi-service traffic controllers, according to at least some embodiments.

FIG. 14 illustrates example programmatic interactions associated with multi-service traffic controllers, according to at least some embodiments. In the depicted embodiment, one or more programmatic interfaces 1477, such as a set of APIs, graphical user interfaces, command line tools, web-based consoles or dashboards, and the like may be implemented by a traffic modeling and control service (TMCS) 1497. TMCS 1497 may enable its clients to submit a variety of requests associated with configuring and using MNTCs of the kind discussed earlier. In some embodiments, a graphical user interface (similar to interface 310 shown in FIG. 3) used for constructing traffic control models using a language with a set of traffic control primitives (e.g., classifiers, flow change deciders, regulators, etc.) may also be used to establish and activate MNTCs.

In the embodiment depicted in FIG. 14, a ConfigureMNTCs request 1402 may be submitted by a client 1495 via programmatic interfaces 1477, requesting that one or more MNTCs be established. Various properties of the requested MNTCs may be indicated in the request 1402, e.g., including for example the set of services which the MNTCs are to monitor and control, the kinds of commands the MNTCs are permitted to issue, whether approval is required before an MNTC issues a command, and so on. In response, metadata describing the requested MNTCs may be stored at a TMCS repository, and a MNTCsConfigured message 1404 may be sent to the client.

In some embodiments, a separate ConnectMNTCs request 1406 may be submitted to the TMCS 1497, indicating the set of traffic control module implementation units (IUs) at one or more services to which the MNTCs should be linked. In some cases, credentials to enable the MNTCs to access the IUs may also be provided in the ConnectMNTCs request 1406, as well as details regarding the kinds of connections to be established (e.g., persistent Transmission Control Protocol (TCP) connections, or transient connections). In response, the TMCS may attempt to establish the requested connectivity, and transmit a MNTCsConnected message 1408 to the client in some embodiments after connectivity has been enabled.

A SetMNTCObjectives request 1410 may be submitted in some embodiments to indicate the system-level (e.g., multi-service) objectives for MNTCs. Such objectives may for example include one or more performance goals (e.g., for throughput, response times, or concurrencies for various types of requests), availability or up-time objectives, resource utilization objectives for processors, network links, network intermediary devices (such as routers, switches, gateways or the like), memory, or storage devices, and so on. In response to such a request, the target objectives may be stored within a TMCS metadata repository in some embodiments, and an ObjectivesSet response message 1412 may be sent to the client 1495.

In some embodiments, an ActivateMNTC request 1414 may be submitted by a client to cause a specified MNTC to begin iterations of traffic data collection and/or analysis. In response, an administrative component of the TMCS may send a command to a specified MNTC to start iterative traffic control operations, and an MNTCActivated message 1416 may be sent to the client to indicate that the MNTC has begun its operations.

According to at least one embodiment, an MNTC may be responsible for coordinating the rollout of software and/or firmware updates to instances or implementation units of various traffic control modules. An InitiateTCMUpdateRollout request 1418, comprising parameters that indicate the specifics of the update such as the version of software/firmware to be applied, the targeted TCM instances, and so on, may be submitted by a TMCS client to start such update rollout procedures. After the update has been rolled out from the appropriate MNTCs, in some embodiments a RolloutComplete message 1420 may be sent to the client. Utilizing MNTCs for unified upgrade management may lead to increased consistency among the software/firmware levels of TCM instances deployed at the different services of the distributed system, which in turn may help increase the quality and effectiveness of the traffic control decisions made with the help of the TCM instances. In at least one embodiment, an MNTC may terminate operations of one or more TCM IUs, e.g., either in response to a programmatic request from a client 1495, or based on analysis of data collected from that IU or other IUs (e.g., data which indicates that the IU is malfunctioning or no longer required due to changes in traffic patterns).

A ShowMNTCManagedTraffic request 1420 may be submitted by a client to obtain a report or visualization of network traffic of the distributed system for which a specified MNTC was configured in the depicted embodiment. In at least one embodiment, a graphical user interface similar to that shown in FIG. 13 may be used for such requests. The data provided in response to such a request (e.g., in a TrafficInfo message 1424) may indicate summarizes of traffic flowing in and out of various services of the distributed system, and/or may highlight changes to traffic flow resulting from commands issued by the MNTC in various embodiments.

In at least some embodiments, a DeactivateMNTC request 1426 may be submitted to request termination of operations of an MNTC. After the MNTC has been deactivated, an MNTCDeactivated message 1428 may be transmitted to the client. In some embodiments, programmatic interactions other than those shown in FIG. 14 may be supported with respect to MNTCs.

Example Provider Network Environment

Figure 15:
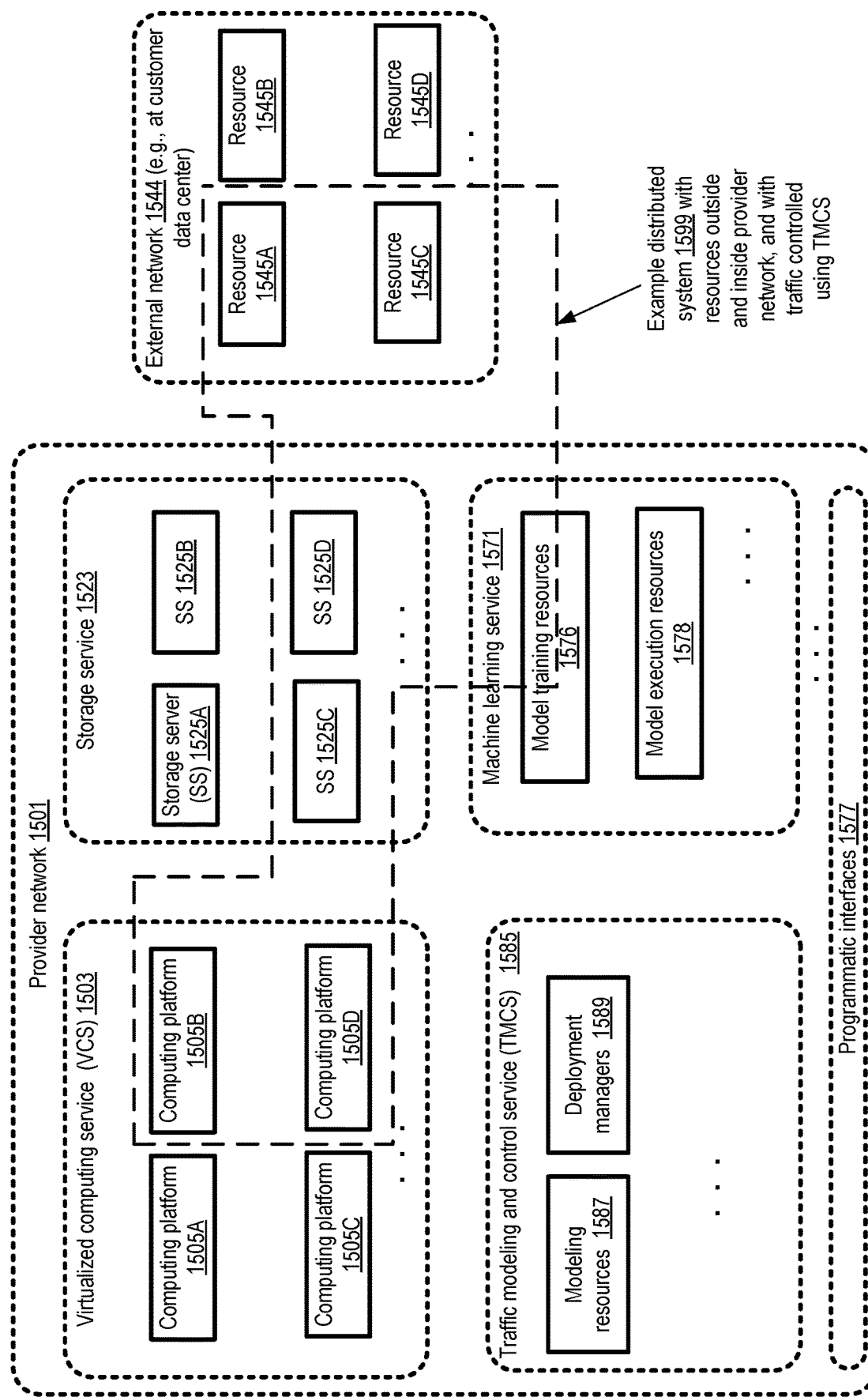
FIG. 15 illustrates an example provider network at which a traffic modeling and control service may be implemented, according to at least some embodiments.

FIG. 15 illustrates an example provider network at which a traffic modeling and control service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 1501 may comprise resources used to implement a plurality of services, including for example a virtualized computing service 1503, a storage service 1523, a machine learning service 1571 as well as a traffic modeling and control service (TMCS) 1585. The machine learning service 1571 may, for example comprise model training resources 1576 and execution resources 1578 for running trained versions of the models.

Each of the services may include a respective set of computing devices and/or other resources in some embodiments. Components of a given service may utilize components of other services in the depicted embodiment—e.g., computing platforms 1505 (such as 1505A-1505D) of the virtualized computing service 1503 and/or storage servers 1525 (e.g., 1525A-1525D) of the storage service may be employed by various other services (including the TMCS 1585) of provider network 1501. Individual ones of the services shown in FIG. 15 may implement a respective set of programmatic interfaces 1577 which can be used by external and/or internal clients (where the internal clients may comprise components of other services) in the depicted embodiment. In some embodiments, the TMCS 1585 may be implemented as a subsystem of the virtualized computing service 1503.

The TMCS 1585 may comprise, among other elements, a set of traffic modeling resources 1587 as well as a set of deployment resources 1589, and may offer features and functionality similar to TMCS 110 of FIG. 1. The traffic modeling resources 1587 may, for example, enable clients to generate traffic models for distributed systems using primitive similar to those discussed earlier (e.g., classifiers, flow change deciders, regulators, etc.). The deployment resources 1589 may be responsible for generating execution units corresponding to the traffic control modules of the models, as well as deploying/activating such execution units.

A variety of resources of different provider network services (and/or resources 1545 located within external networks 1544, e.g., at a customer data center) may be used to implement applications on behalf of clients of the provider network 1501 in some embodiments. Such collections of resources may represent examples of the kinds of distributed systems whose network traffic may be modeled and managed with the help of the TMCS 1585. Example distributed system 1599 may, for example, comprise computing platforms 1505B and 1505D of the VCS 1503, storage servers 1525C and 1525D of the storage service, a subset of model training resources 1576 of machine learning service 1571, and external resources 1545A and 1545C in the depicted embodiment. Traffic flowing among the different components of distributed system 1599 may be classified, tracked and shaped using traffic control module instances of the kind introduced earlier.

In at least one embodiment, at least some of the techniques discussed above for modeling and controlling network traffic may be accomplished using non-specialized computing platforms (e.g., virtual machines) of the virtualized computing service 1503. In some embodiments, the modeling and control techniques may be implemented without acquiring resources of network-accessible services such as those shown in FIG. 15. For example, a standalone set of tools implemented at one or more computing devices which are not part of a network-accessible service may be used in some embodiments.

Example Methods for Traffic Modeling and Control

Figure 16:
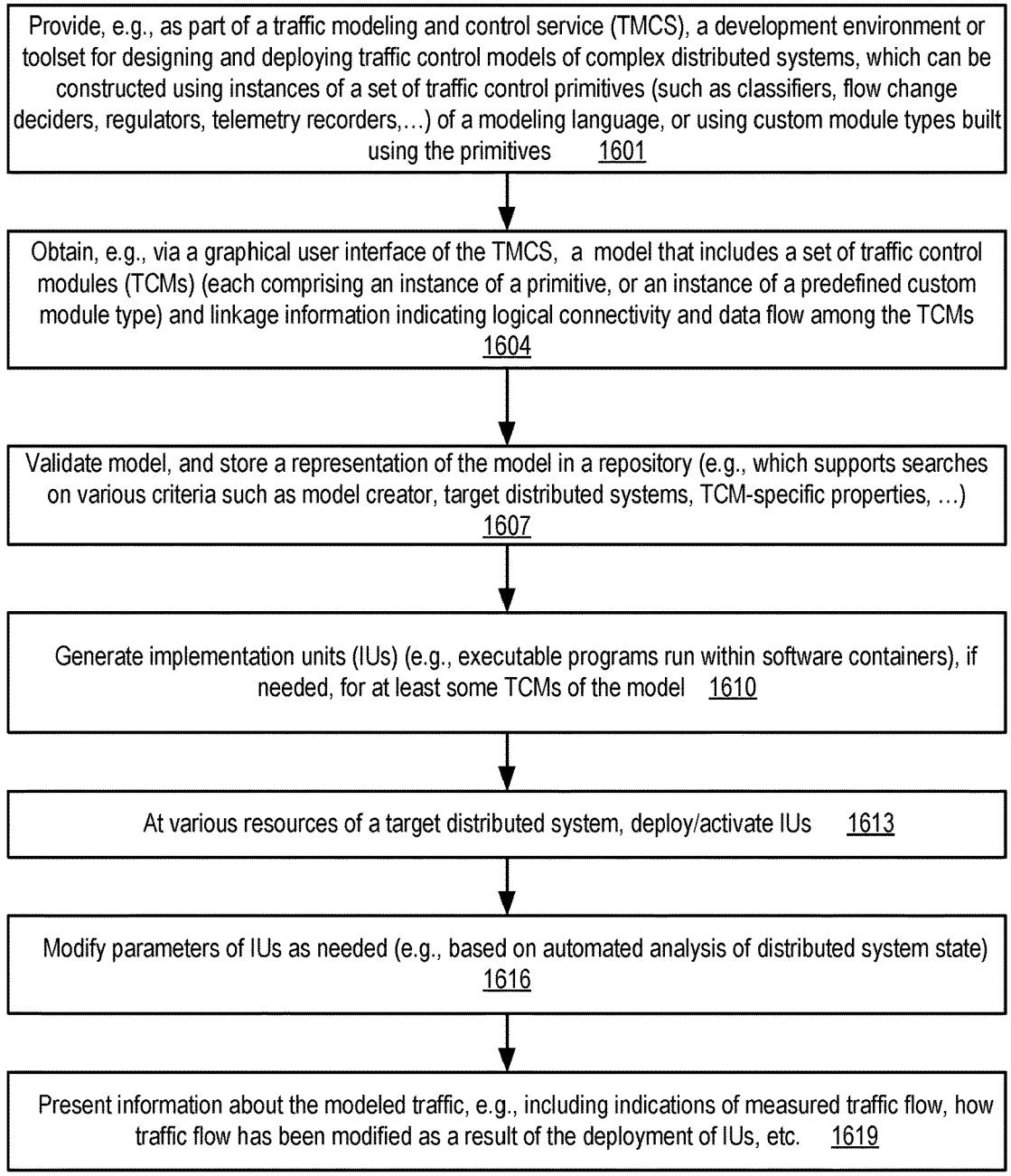
FIG. 16 is a flow diagram illustrating aspects of operations that may be performed to model and control network traffic of a distributed system, according to at least some embodiments.

FIG. 16 is a flow diagram illustrating aspects of operations that may be performed to model and control network traffic of a distributed system, according to at least some embodiments. As shown in element 1601, a development environment or tool set for designing and deploying traffic control models of complex distributed systems may be provided in some embodiments, e.g., by a traffic modeling and control service (TMCS) similar in features and functionality to TMCS 110 of FIG. 1. The toolset or development environment may provide indications of a set of traffic control primitives in various embodiments, such as the classifier, flow change decision (FCD), regulator, telemetry recorder, and/or aggregator primitives discussed earlier, instances of which can be interlinked to generate models. In some embodiments, a tool set may include interfaces that can be used to generate and store custom traffic control module types (e.g., by submitting requests similar to the SaveCustomTCMType request discussed earlier), instances of which may also be included in models. As such, the modeling language may be extensible in at least some embodiments.

A model that includes a collection of traffic control modules (TCMs), each representing a respective instance of a primitive or a custom module type, may be obtained (element 1604), e.g., via a graphical or non-graphical user interface of a TMCS. The model may also include linkage information for the TCMs, indicating the logical connectivity or data flow paths among the TCMs. In effect, in some embodiments, a model may comprise a directed graph, with nodes representing individual TCMs and edges representing the transfer of information among the TCMs—e.g., indicating that the input consumed at one TCM may comprise the output generated at another TCM. The model may also include nodes representing information about external data sources (e.g., entities other than TCMs, such as various measurement tools/processes) and/or data sinks (e.g., a node representing dropped/rejected messages or packets) in at least one embodiment.

A number of validation operations may be run on the model, and a persistent representation of the model may be stored in a repository if the model is successfully validated in the depicted embodiment (element 1607). The repository may support searches and other types of queries on the stored models and/or on individual TCMs or other properties of the models in some embodiments. For example, a TMCS client may submit a query with one or more predicates or clauses indicating model names, owners/creators, targeted distributed systems, properties of TCMs (such as whether a model comprises a regulator TCM that uses redirection) or the like, and indications of zero or more pre-created models that match the specified criteria may be returned in response to such a query.

In some embodiments, implementation units (IUs), such as executable programs that run within isolated software containers to implement the logic of one or more TCMs of a model, may be generated or created, e.g., in response to programmatic requests submitted to a TMCS (element 1610). Note that in some cases, an IU need not be generated at a TMCS—e.g., a client may provide an executable unit, or a modeled distributed system may already have running programs/tools that implement one or more TCMs. In some embodiments, a TMCS may provide a library of template implementations of TCMs corresponding to at least some primitives, and an IU may be generated from such a template at the request of a client. For example, such templates may represent baseline implementations of each of the different primitives and custom TVM types, with parameters which can be filled in or customized to generate IUs.

Implementation units corresponding to one or more TCMs of the model may be activated or deployed, e.g., to various resources or network paths of a target distributed system in the depicted embodiment (element 1613). In some embodiments, a TMCS may provide APIs or other programmatic interfaces that can be used to request deployment/activation of TCMs of a model, and the deployment/activation may be implemented in response to such requests.

According to at least some embodiments, parameters of deployed/activated IUs may be dynamically modified as needed (element 1616), e.g., based on automated analysis of the state of the targeted distributed system, and/or based on programmatic requests from TMCS clients. Information about the modeled traffic of the distributed system, e.g., including indications of changes to traffic flow resulting from operations performed at various IUs, may be presented in at least some embodiments (element 1619), e.g., via dashboards or similar graphical interfaces.

Figure 17:
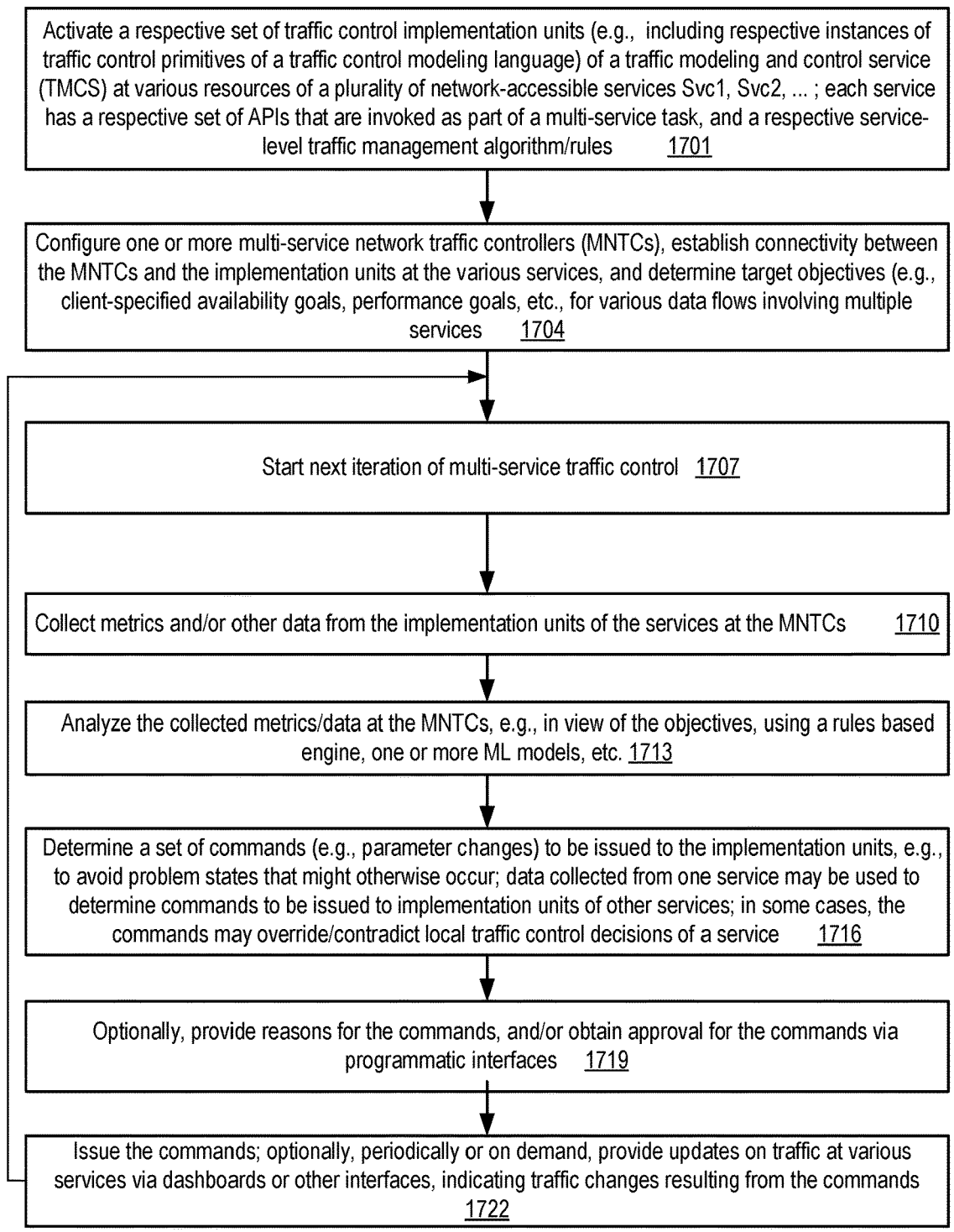
FIG. 17 is a flow diagram illustrating aspects of multi-service network traffic control operations that may be performed at a distributed system, according to at least some embodiments.

FIG. 17 is a flow diagram illustrating aspects of multi-service network traffic control operations that may be performed at a distributed system, according to at least some embodiments. As shown in element 1701, a respective set of traffic control implementation units (including respective instances of one or more traffic control primitives of a modeling language similar of a traffic modeling and control service (TMCS) similar to TMCS 110 of FIG. 1) may be deployed to and/or activated at various resources of network-accessible services (e.g., Srvc1, Srvc2, etc.) of a distributed system. Individual ones of the services may implement their own APIs, and enforce their own service-level traffic management algorithms or rules in some embodiments. For example, the services may each have been developed independently of each other, by respective design and development teams that were each provided performance and/or availability objectives specific to their service. In at least some embodiments, individual ones of the services may comprise their own service-level traffic controllers, responsible for making traffic shaping decisions intended to attain the service-level objectives, independently of the objectives of other services.

In various embodiments, a set of multi-service network traffic controllers (MNTCs), similar in features and functionality to the MNTCs 1150 shown in FIG. 11, may be configured or established (element 1704), e.g., in response to one or more programmatic requests submitted by an TMCS client. In some embodiments, for example, an event collector MNTC may be set up to obtain traffic data from a plurality of services, while a command distributor MNTC may be set up to propagate commands such as parameter changes to one or more of the services. A given MNTC may be implemented using a combination of software and hardware of one or more computing devices in some embodiments. The configuration of an MNTC may involve several sub-operations in some embodiments, including deploying software to the computing device(s) designated for the MNTC, transmitting metadata identifying the various traffic control module (TCM) implementation units (IUs) and service resources to which the MNTC is to be linked, establishing network connectivity between the TCM IUs and the MNTC, providing overall system-wide objectives (e.g., performance objectives, concurrency objectives, availability objectives, resource utilization targets, etc.) for various data flows implemented at the services, and so on.

The MNTCs may perform multi-service traffic control iteratively in at least some embodiments. The next iteration of traffic control for the various services may be begun in operations corresponding to element 1707 of FIG. 17. Traffic metrics and/or other traffic data (e.g., current parameter values at various IUs) may be collected from various services at the MNTCs (element 1710). The collected metrics and/or data may be analyzed, e.g., in view of the system-level (as opposed to service-level) objectives at the MNTCs (element 1713). A number of different methodologies or techniques may be used to analyze the traffic data in various embodiments, including for example one or more machine learning or inference models, rules engines, and so on.

Based on the results of the analysis, a set of commands (e.g., commands that result in changes to parameters of TCM IUs) may be determined in the depicted embodiment (element 1716). The commands may for example be intended to avoid problem states (such as overloading of resources, dropped service requests, etc.) for various applications or data flows being performed at the distributed system using a combination of several of the monitored services. In some cases, traffic data collected from IUs of one service may be used to determine commands to be issued to IUs at other services. In some embodiments, it may be the case that the commands determined at the MNTCs may override or contradict local traffic control decisions made within individual services, e.g., at the per-service level. In one such embodiment, the MNTC commands may be assigned higher priorities than the commands which are generated locally within an individual service.

According to at least one embodiment, the MNTCs may optionally provide reasons/justifications for their commands, e.g., to enable an administrator of a service or an administrator of the distributed system to review the commands before they are implemented (element 1719). In some embodiments, explicit or implicit approval may be obtained before a proposed command is transmitted to a target IU or implemented at a target IU. For example, an indication that a particular proposed command has been generated by the MNTCs may be provided via a notification mechanism, a dashboard or other interface which allows an authorized administrator to approve or disapprove the proposal. If the administrator approves the proposed command, or does not disapprove within a particular time interval, the command may be issued in one embodiment. In other embodiments, implicit approvals (e.g., absences of disapproval) may not be used, and explicit approvals may be required for at least some types of parameter changes or commands.

The commands identified during the iteration at the MNTCs may be issued or transmitted to the targeted IUs and/or other resources within the distributed system (element 1722) in the depicted embodiment. Optionally, the MNTCs may provide updates on traffic observed/experienced at various services via dashboards or other interfaces, e.g., periodically or on demand. The updates may for example indicate traffic changes resulting from the commands. Operations corresponding to elements 1707 onwards may be repeated for each iteration in the depicted embodiment. Note that it may be the case in some iterations that no command need to be issued—e.g., the analysis performed by the MNTCs may indicate that the current state of traffic flowing among the various services of the distributed system is likely, if continued, to meet the overall objectives of the distributed system.

It is noted that in various embodiments, at least some operations other than those illustrated in the flow diagrams of FIG. 16 and FIG. 17 may be used to implement the traffic modeling and control techniques described above. Some of the operations shown may not be implemented in some embodiments or may be implemented in a different order, or in parallel rather than sequentially.

Use Cases

The techniques described above for enabling traffic control models to be generated for complex distributed systems, and for implementing various types of traffic change decisions, may be useful in a variety of scenarios. Many modern applications are deployed at Internet scale, with resources organized into a multiplicity of independent network-accessible services being deployed collectively to respond to various types of application requests. The number of resources and services employed may be so large that understanding the flow of traffic required to service a given request may be difficult, and making intelligent decisions to achieve overall objectives of the service may be even harder. A modeling language and tool set of the kind described may make the task of application administration much easier, as a few simple primitives pf the language may be used to construct rich customizable models of traffic for applications and services of arbitrary complexity. A traffic modeling and control service (TMCS) may enable not just the construction of such easy-to-understand and easy-to-explain models, but also the generation of implementations of such models, and the deployment of traffic control units to various locations within the targeted distributed systems to achieve desired objectives. The establishment of multi-service traffic controllers may enable more holistic traffic control decision making than would be possible at the level of individual services—e.g., information gathered from one service may be used to change traffic control parameters at other services to improve the probability of achieving system-wide targets for performance, availability, resource utilization levels etc.

Illustrative Computer System

Figure 18:
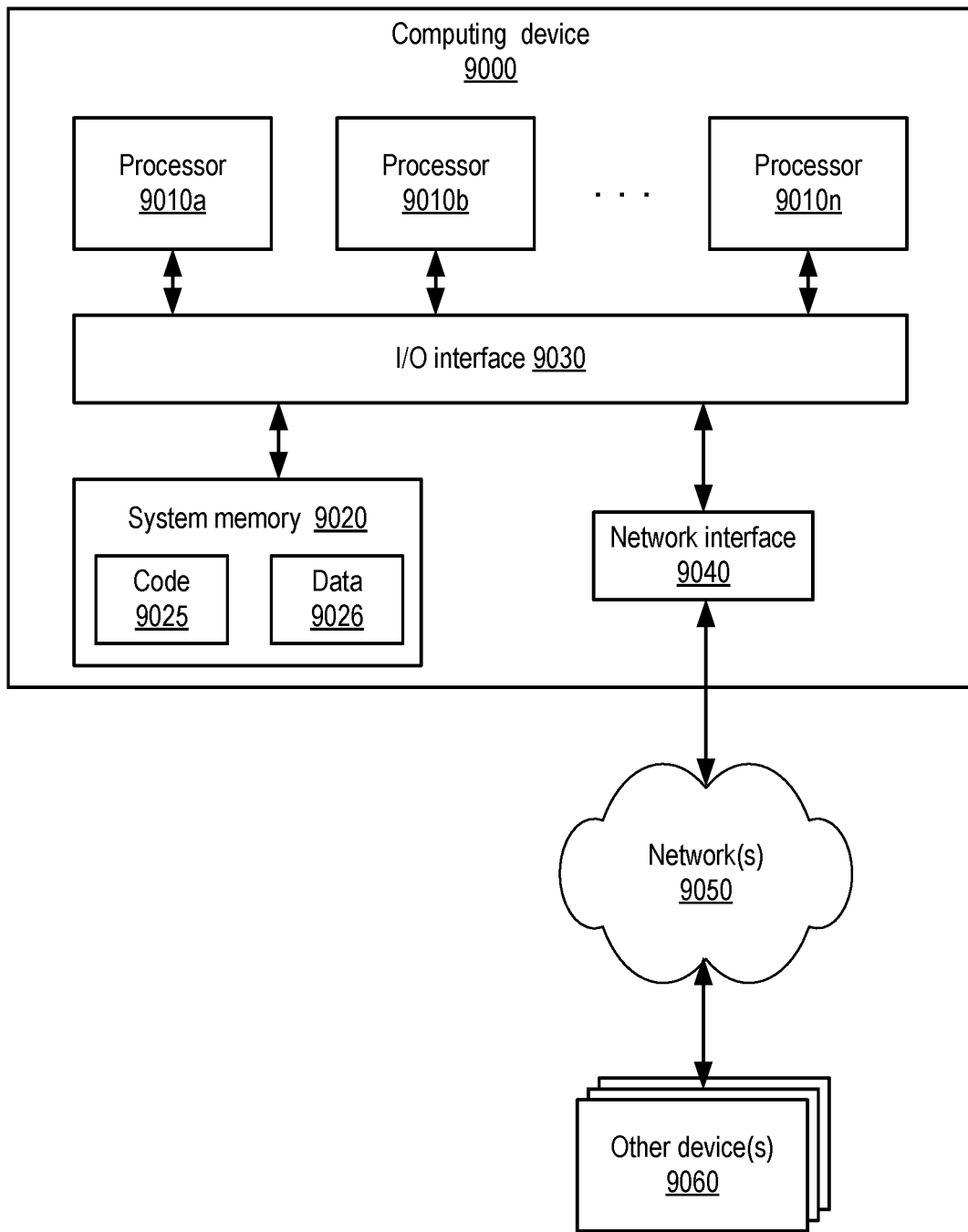
FIG. 18 is a block diagram illustrating an example computing device that may be used in at least some embodiments.

In at least some embodiments, a server that implements a portion or all of one or more of the technologies described herein, including various components of a traffic modeling and control service, multi-service network traffic controllers and the like may include a general-purpose computer system that includes or is configured to access one or more computer-accessible media. FIG. 18 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030. In at least some embodiments computing device 9000 may include a motherboard to which some or all of such components may be attached.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 17, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 17 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 18 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Embodiments of the disclosure can be described in view of the following clauses:

1. A system, comprising:
one or more computing devices;
wherein the one or more computing devices include instructions that upon execution on or across one or more processors cause the one or more computing devices to:
provide, via one or more programmatic interfaces, an indication of a plurality of traffic control primitives from which traffic control models can be generated, including at least a classifier primitive, a flow change decider primitive, and a regulator primitive;
obtain, via the one or more programmatic interfaces, an indication of a traffic control model, wherein the model includes (a) a plurality of traffic control modules, wherein individual ones of the traffic control modules comprise respective instances of traffic control primitives, and (b) linkage information of the plurality of traffic control modules, wherein the linkage information indicates that output produced by a first traffic control module is to be consumed at a second traffic control module;
generate, corresponding to at least some traffic control modules of the plurality of traffic control modules, respective implementation units, including at least a first implementation unit corresponding to the first traffic control module, and a second implementation unit corresponding to the second traffic control module;
activate (a) the first implementation unit at one or more target resources within a distributed system, and (b) the second implementation unit at one or more target resources within the distributed system; and
cause an indication of a modification of network traffic of the distributed system to be presented to one or more destinations, wherein the modification is based at least in part on operations performed by one or more implementation units of the respective implementation units.

2. The system as recited in clause 1, wherein the first traffic control module is an instance of the classifier primitive, wherein the one or more computing devices include further instructions that upon execution on or across one or more processors further cause the one or more computing devices to:

store metadata of a traffic classification algorithm of the first traffic control module, wherein the metadata comprises a respective indication of one or more of: (a) one or more sources from which classification input for a traffic flow is to be obtained, (b) stateless data to be used to classify a traffic flow, (c) state data to be used to classify a traffic flow, (d) offline tools to be used to classify a traffic flow, or (e) a set of classes into which traffic flows are to be categorized.

3. The system as recited in clause 1, wherein the first traffic control module is an instance of the flow change decider primitive, wherein the one or more computing devices include further instructions that upon execution on or across one or more processors further cause the one or more computing devices to:

store metadata of a decision algorithm of the first traffic control module, wherein the metadata comprises a respective indication of one or more of: (a) an overload detection algorithm, (b) a traffic rate detection algorithm, (c) a traffic concurrency detection algorithm, (d) a flow randomization algorithm, (e) a class of traffic to which the decision algorithm is applicable, or (f) a condition to be checked to redistribute traffic.

4. The system as recited in clause 1, wherein the first traffic control module is an instance of the regulator primitive, wherein the one or more computing devices include further instructions that upon execution on or across one or more processors further cause the one or more computing devices to:

store metadata of a flow regulation algorithm of the first traffic control module, wherein the metadata comprises a respective indication of one or more of: (a) a traffic queueing algorithm, (b) a message rejection algorithm, (c) a message redirection algorithm, (d) a routing algorithm, or (e) a channel activation algorithm.

5. The method as recited in clause 1, wherein the plurality of traffic control primitives includes a telemetry recorder primitive, wherein the first traffic control module is an instance of the telemetry recorder primitive, wherein the one or more computing devices include further instructions that upon execution on or across one or more processors further cause the one or more computing devices to:

store metadata of the first traffic control module, wherein the metadata comprises a respective indication of one or more of: (a) a metric to be collected from a traffic flow, (b) a report format in which a metric is to be reported, (c) a reporting interval or frequency of a metric, or (d) one or more destinations to which reports of a metric are to be transmitted.

6. A method, comprising:
performing, at one or more computing devices:
obtaining, via one or more programmatic interfaces, an indication of a first traffic control model, wherein the first traffic control model includes (a) a plurality of traffic control modules, wherein individual ones of the traffic control modules comprise respective instances of traffic control primitives selected from a set of primitives that includes at least a classifier primitive and a flow change decider primitive, and (b) linkage information of the plurality of traffic control modules, wherein the linkage information indicates that output produced by a first traffic control module is to be consumed at a second traffic control module;
activating, corresponding to at least some traffic control modules of the plurality of traffic control modules, respective implementation units to one or more resources of a distributed system, including at least a first implementation unit corresponding to the first traffic control module, and a second implementation unit corresponding to the second traffic control module; and
causing an indication of network traffic of the distributed system to be presented to one or more destinations, wherein the modification is based at least in part on operations performed by one or more implementation units of the respective implementation units.

7. The method as recited in clause 6, wherein the indication of the traffic control model comprises a graph generated via a graphical user interface, wherein the graph comprises a plurality of nodes, wherein individual ones of the nodes represent respective traffic control modules, wherein the linkage information is indicated by one or more edges of the graph.

8. The method as recited in any of clauses 6-7, wherein a first resource of the one or more resources includes one of: (a) a compute instance at a virtualization server of a virtualized computing service, (b) an un-virtualized server, (c) a router, (d) a switch, (e) a gateway, or (f) a load balancer.

9. The method as recited in any of clauses 6-8, wherein the plurality of traffic control modules includes a third traffic control module, a fourth traffic control module and a fifth traffic control module, wherein the first traffic control module processes data associated with a network layer of the Open Systems Interconnection (OSI) model, wherein the third traffic control module processes data associated with a transport layer of the OSI model, wherein the fourth traffic control module processes data associated with an application layer of the OSI model, and wherein the fifth traffic control module processes data associated with a business logic layer of one or more applications or services of the distributed system.

10. The method as recited in any of clauses 6-9, further comprising performing, at the one or more computing devices:

obtaining, via a programmatic interface, a request to generate a custom traffic control module type, wherein the request indicates one or more properties of the custom traffic control module type; and
storing a representation of a second traffic control model at the traffic control service, wherein the second traffic control model includes an instance of the custom traffic control module type.

11. The method as recited in any of clauses 6-10, further comprising performing, at the one or more computing devices:

storing respective representations of a plurality of traffic control models in a repository, including the first traffic control model;
obtaining a search request for a traffic control model via a programmatic interface;
providing, via the programmatic interface, a representation of a particular traffic control model selected from the plurality of traffic control models based on a criterion indicated in the search request; and
storing an additional traffic control model in the repository, wherein the additional traffic control model comprises a modified version of the particular traffic control model.

12. The method as recited in any of clauses 6-11, wherein the first traffic control module is an instance of the classifier primitive, the method further comprising performing, at the one or more computing devices:

storing metadata of a traffic classification algorithm of the first traffic control module, wherein the metadata comprises a respective indication of one or more of: (a) one or more sources from which classification input for a traffic flow is to be obtained, (b) stateless data to be used to classify a traffic flow, (c) state data to be used to classify a traffic flow, (d) offline tools to be used to classify a traffic flow, or (e) a set of classes into which traffic flows are to be categorized.

13. The method as recited in any of clauses 6-11, wherein the first traffic control module is an instance of the classifier primitive, the method further comprising performing, at the one or more computing devices:

storing an indication of one or more traffic properties to be used for classifying traffic flows, wherein a property of the one or more traffic properties comprises one or more of: (a) an identity of a source of a message of a traffic flow, (b) a target activity requested in a message of a traffic flow, (c) a request identifier assigned to a message of the traffic flow is directed, (d) a cost metric associated with executing an operation requested in a message of the traffic flow, (e) an estimate of a value assigned to a message of the traffic flow, or (f) a priority assigned to a message of the traffic flow.

14. The method as recited in any of clauses 6-11, wherein the first traffic control module is an instance of the flow change decider primitive, the method further comprising performing, at the one or more computing devices:

storing metadata of a decision algorithm of the first traffic control module, wherein the metadata comprises a respective indication of one or more of: (a) an overload detection algorithm, (b) a traffic rate detection algorithm, (c) a traffic concurrency detection algorithm, (d) a flow randomization algorithm, (e) a class of traffic to which the decision algorithm is applicable, or (f) a condition to be checked to redistribute traffic.

15. The method as recited in any of clauses 6-11, wherein the set of primitives includes a regulator primitive, wherein the first traffic control module is an instance of the regulator primitive, the method further comprising performing, at the one or more computing devices:

storing metadata of a flow alteration algorithm of the first traffic control module, wherein the metadata comprises a respective indication of one or more of: (a) a traffic queueing algorithm, (b) a message rejection algorithm, (c) a message redirection algorithm, (d) a routing algorithm, or (e) a channel activation algorithm.

16. One or more non-transitory computer-accessible storage media storing program instructions that when executed on or across one or more processors cause one or more computer systems to:

obtain, via one or more programmatic interfaces, an indication of a first traffic control model, wherein the first traffic control model includes (a) a plurality of traffic control modules, wherein individual ones of the traffic control modules comprise respective instances of traffic control primitives selected from a set of primitives that includes at least a classifier primitive and a flow change decider primitive, and (b) linkage information of the plurality of traffic control modules, wherein the linkage information indicates that output produced by a first traffic control module is to be consumed at a second traffic control module;

store a persistent representation of the first traffic control model in a repository; and deploy, corresponding to at least some traffic control modules of the plurality of traffic control modules, respective implementation units to one or more resources of a distributed system, including at least a first implementation unit corresponding to the first traffic control module, and a second implementation unit corresponding to the second traffic control module.

17. The one or more non-transitory computer-accessible storage media as recited in clause 16, wherein the first implementation unit is deployed within an isolated software container.

18. The one or more non-transitory computer-accessible storage media as recited in any of clauses 16-17, wherein the indication of the first traffic control model comprises a graph generated via a graphical user interface, wherein the graph comprises a plurality of nodes, wherein individual ones of the nodes represent respective traffic control modules, wherein the linkage information is indicated by one or more edges of the graph.

19. The one or more non-transitory computer-accessible storage media as recited in any of clauses 16-18, wherein a first resource of the one or more resources includes one of: (a) a compute instance at a virtualization server of a virtualized computing service, (b) a non-virtualized server, (c) a router, (d) a switch, (e) a gateway, or (f) a load balancer.

20. The one or more non-transitory computer-accessible storage media as recited in any of clauses 16-19, storing further program instructions that when executed on or across one or more processors further cause the one or more computer systems to:

obtain, via a programmatic interface, a request to generate a custom traffic control module type, wherein the request indicates one or more properties of the custom traffic control module type; and store a representation of a second traffic control model at the traffic control service, wherein the second traffic control model includes an instance of the custom traffic control module type.

Embodiments of the disclosure can also be described in view of the following clauses:

1. A system, comprising:

one or more computing devices;

wherein the one or more computing devices include instructions that upon execution on or across one or more processors cause the one or more computing devices to:

activate, at a first set of resources of a first network-accessible service of a distributed system, a first collection of traffic control implementation units, including a first traffic control implementation unit comprising an instance of a classifier primitive of a traffic control modeling language, and a second traffic control implementation unit comprising an instance of a flow change decider primitive of the traffic control modeling language, wherein at least some network traffic control decisions of the first network-accessible service are made according to a first set of traffic control rules, and wherein a first application programming interface implemented at the first network-accessible service is invoked as part of a multi-service dataflow;

activate, at a second set of resources of a second network-accessible of the distributed system, a second collection of traffic control implementation units, wherein at least some network traffic control decisions of the second network-accessible service are made according to a second set of traffic control rules, and wherein a second application programming interface implemented at the second network-accessible service is invoked as part of the multi-service dataflow;

collect, at one or more multi-service network traffic controllers, traffic data generated at a plurality of traffic control implementation units, including at least one traffic control implementation unit of the first collection and at least one traffic control implementation unit of the second collection;

determine, at the one or more multi-service network traffic controllers, based at least in part on data collected from a traffic control implementation unit of the second collection, a modification to be made to a parameter of a traffic control implementation unit of the first collection;

cause the modification to be applied at the traffic control implementation unit of the second collection; and cause an indication of a change of network traffic resulting from the modification to be presented via one or more programmatic interfaces.

2. The system as recited in clause 1, wherein the modification comprises a change to one or more of: (a) a permitted message flow rate, (b) a message prioritization rule, (c) a routing destination, or (d) a maximum queue depth for messages.

3. The system as recited in any of clauses 1-2, wherein the one or more computing devices include further instructions that upon execution on or across one or more processors further cause the one or more computing devices to:

obtain metadata pertaining to a plurality of services, including the first network-accessible service and the second network-accessible service;

classify a first subset of the plurality of services, based at least in part on analysis of the metadata, into a first group;

generate a summarized representation of the plurality of services, wherein within the summarized representation, individual services of the first group are replaced by an aggregated logical service; and transmit the summarized representation to one or more recipients.

4. The system as recited in any of clauses 1-3, wherein the one or more computing devices include further instructions that upon execution on or across one or more processors further cause the one or more computing devices to:

provide, via a programmatic interface, an indication of a justification for the modification.

5. The system as recited in any of clauses 1-4, wherein the one or more computing devices include further instructions that upon execution on or across one or more processors further cause the one or more computing devices to:

prior to causing the modification to be applied, indicating, via a programmatic interface, that the modification is proposed.

6. A method, comprising:

performing, at one or more computing devices:

establishing connectivity between (a) one or more multi-service network traffic controllers and (b) a plurality of traffic control implementation units, including at least one traffic control implementation unit deployed at a first network-accessible service and at least one traffic control implementation unit deployed at a second network-accessible service, wherein individual ones of the traffic control implementation units comprise a respective instance of a primitive of a traffic control modeling language;

determining, at the one or more multi-service network traffic controllers, based at least in part on data collected from a traffic control implementation unit deployed at the second network-accessible service, a modification to be made to a parameter of a traffic control implementation unit deployed to the first network-accessible service; and causing the modification to be applied at the traffic control implementation unit deployed at the first network-accessible service, wherein the modification results in a change to a traffic flow at the second network-accessible service.

7. The method as recited in clause 6, further comprising performing, at the one or more computing devices:

prior to causing the modification to be applied, providing an indication of the modification via a programmatic interface.

8. The method as recited in any of clauses 6-7, further comprising performing, at the one or more computing devices:

providing, via a programmatic interface, an indication of a justification for the modification.

9. The method as recited in any of clauses 6-8, further comprising performing, at the one or more computing devices:

obtaining metadata pertaining to a plurality of services, including the first network-accessible service and the second network-accessible service;

classifying a first subset of the plurality of services, based at least in part on analysis of the metadata, into a first group;

preparing a summarized representation of the plurality of services, wherein within the summarized representation, individual services of the first group are replaced by an aggregated logical service; and transmitting the summarized representation from the one or more multi-service controllers to one or more recipients.

10. The method as recited in clause 9, wherein the analysis of the metadata comprises determining that a first service and a second service of the first subset meet a similarity criterion, wherein the determining of the modification is based at least in part on input provided by another multi-service network traffic controller assigned to the first group, and wherein the input comprises metrics aggregated from a plurality of services of the first subset.

11. The method as recited in any of clauses 6-9, wherein the modification comprises a change to one or more of: (a) a permitted message flow rate, (b) a message prioritization rule, (c) a routing destination, or (d) a maximum queue depth for messages.

12. The method as recited in any of clauses 6-9 or 11, wherein the modification is identified based on a result of a machine learning model.

13. The method as recited in any of clauses 6-9 or 11-12, further comprising performing, at the one or more computing devices:

initiating, by the one or more multi-service network traffic controllers, a software or firmware update of a first traffic control implementation unit; and terminating, by the one or more multi-service network traffic controllers, operations of a second traffic control implementation unit.

14. The method as recited in any of clauses 6-9 or 11-13, wherein the first traffic control implementation unit is deployed within an isolated software container.

15. The method as recited in any of clauses 6-9 or 11-14, further comprising performing, at the one or more computing devices:

obtaining, via a programmatic interface, one or more target objectives for a type of data flow task which comprises message transfers between a plurality of services including the first network-accessible service and the second network-accessible service, wherein the one or more target objectives include one or more of: (a) a performance objective, (b) an availability objective, or (c) a concurrency objective;

wherein determining the modification based at least in part on the one or more target objectives.

16. One or more non-transitory computer-accessible storage media storing program instructions that when executed on or across one or more processors cause one or more computer systems to:

configure one or more multi-service network traffic controllers, wherein the one or more multi-service network traffic controllers are connected to a plurality of traffic control implementation units, including at least one traffic control implementation unit activated at a first network-accessible service and at least one traffic control implementation unit activated at a second network-accessible service;

determine, at the one or more multi-service network traffic controllers, based at least in part on data collected from a traffic control implementation unit deployed at the second network-accessible service, a modification to be made to a parameter of a traffic control implementation unit deployed to the first network-accessible service; and cause the modification to be applied at the traffic control implementation unit deployed to the first network-accessible service, wherein the modification results in a change to a traffic flow at the second network-accessible service.

17. The one or more non-transitory computer-accessible storage media as recited in clause 16, storing further program instructions that when executed on or across one or more processors further cause one or more computer systems to:

prior to causing the modification to be applied, provide an indication of the modification via a programmatic interface.

18. The one or more non-transitory computer-accessible storage media as recited in any of clauses 16-17, storing further program instructions that when executed on or across one or more processors further cause one or more computer systems to:

provide, via a programmatic interface, an indication of a justification for the modification.

19. The one or more non-transitory computer-accessible storage media as recited in any of clauses 16-18, wherein the traffic control implementation unit activated at the first network-accessible service is activated at one or more of: (a) a compute instance at a virtualization server of a virtualized computing service, (b) a non-virtualized server, (c) a router, (d) a switch, (e) a gateway, or (f) a load balancer.

20. The one or more non-transitory computer-accessible storage media as recited in any of clauses 16-19, storing further program instructions that when executed on or across one or more processors further cause one or more computer systems to:

obtain metadata pertaining to a plurality of services, including the first network-accessible service and the second network-accessible service;

classify a first subset of the plurality of services, based at least in part on analysis of the metadata, into a first group;

generate a summarized representation of the plurality of services, wherein within the summarized representation, individual services of the first group are replaced by an aggregated logical service; and transmit the summarized representation from the one or more multi-service controllers to one or more recipients.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across one or more processors cause the one or more computing devices to:

activate, at a first set of resources of a first network-accessible service of a distributed system, a first collection of traffic control implementation units, including a first traffic control implementation unit comprising an instance of a classifier primitive of a traffic control modeling language, and a second traffic control implementation unit comprising an instance of a flow change decider primitive of the traffic control modeling language, wherein at least some network traffic control decisions of the first network-accessible service are made according to a first set of traffic control rules, and wherein a first application programming interface implemented at the first network-accessible service is invoked as part of a multi-service dataflow;

activate, at a second set of resources of a second network-accessible of the distributed system, a second collection of traffic control implementation units, wherein at least some network traffic control decisions of the second network-accessible service are made according to a second set of traffic control rules, and wherein a second application programming interface implemented at the second network-accessible service is invoked as part of the multi-service dataflow;

collect, at one or more multi-service network traffic controllers, traffic data generated at a plurality of traffic control implementation units, including at least one traffic control implementation unit of the first collection and at least one traffic control implementation unit of the second collection;

determine, at the one or more multi-service network traffic controllers, based at least in part on data collected from a traffic control implementation unit of the second collection, a modification to be made to a parameter of a traffic control implementation unit of the first collection;

cause the modification to be applied at the traffic control implementation unit of the second collection; and cause an indication of a change of network traffic resulting from the modification to be presented via one or more programmatic interfaces.

2. The system as recited in claim 1, wherein the modification comprises a change to one or more of: (a) a permitted message flow rate, (b) a message prioritization rule, (c) a routing destination, or (d) a maximum queue depth for messages.

3. The system as recited in claim 1, wherein the one or more computing devices include further instructions that upon execution on or across one or more processors further cause the one or more computing devices to:

obtain metadata pertaining to a plurality of services, including the first network-accessible service and the second network-accessible service;

classify a first subset of the plurality of services, based at least in part on analysis of the metadata, into a first group;

generate a summarized representation of the plurality of services, wherein within the summarized representation, individual services of the first group are replaced by an aggregated logical service; and transmit the summarized representation to one or more recipients.

4. The system as recited in claim 1, wherein the one or more computing devices include further instructions that upon execution on or across one or more processors further cause the one or more computing devices to:

provide, via a programmatic interface, an indication of a justification for the modification.

5. The system as recited in claim 1, wherein the one or more computing devices include further instructions that upon execution on or across one or more processors further cause the one or more computing devices to:

prior to causing the modification to be applied, indicating, via a programmatic interface, that the modification is proposed.

6. A method, comprising:

performing, at one or more computing devices:

establishing connectivity between (a) one or more multi-service network traffic controllers and (b) a plurality of traffic control implementation units, including at least one traffic control implementation unit deployed at a first network-accessible service and at least one traffic control implementation unit deployed at a second network-accessible service, wherein individual ones of the traffic control implementation units comprise a respective instance of a primitive of a traffic control modeling language;

determining, at the one or more multi-service network traffic controllers, based at least in part on data collected from a traffic control implementation unit deployed at the second network-accessible service, a modification to be made to a parameter of a traffic control implementation unit deployed to the first network-accessible service; and causing the modification to be applied at the traffic control implementation unit deployed at the first network-accessible service, wherein the modification results in a change to a traffic flow at the second network-accessible service.

7. The method as recited in claim 6, further comprising performing, at the one or more computing devices:

prior to causing the modification to be applied, providing an indication of the modification via a programmatic interface.

8. The method as recited in claim 6, further comprising performing, at the one or more computing devices:

providing, via a programmatic interface, an indication of a justification for the modification.

9. The method as recited in claim 6, further comprising performing, at the one or more computing devices:

obtaining metadata pertaining to a plurality of services, including the first network-accessible service and the second network-accessible service;

classifying a first subset of the plurality of services, based at least in part on analysis of the metadata, into a first group;

preparing a summarized representation of the plurality of services, wherein within the summarized representation, individual services of the first group are replaced by an aggregated logical service; and transmitting the summarized representation from the one or more multi-service controllers to one or more recipients.

10. The method as recited in claim 9, wherein the analysis of the metadata comprises determining that a first service and a second service of the first subset meet a similarity criterion, wherein the determining of the modification is based at least in part on input provided by another multi-service network traffic controller assigned to the first group, and wherein the input comprises metrics aggregated from a plurality of services of the first subset.

11. The method as recited in claim 6, wherein the modification comprises a change to one or more of: (a) a permitted message flow rate, (b) a message prioritization rule, (c) a routing destination, or (d) a maximum queue depth for messages.

12. The method as recited in claim 6, wherein the modification is identified based on a result of a machine learning model.

13. The method as recited in claim 6, further comprising performing, at the one or more computing devices:

initiating, by the one or more multi-service network traffic controllers, a software or firmware update of a first traffic control implementation unit; and terminating, by the one or more multi-service network traffic controllers, operations of a second traffic control implementation unit.

14. The method as recited in claim 6, wherein the first traffic control implementation unit is deployed within an isolated software container.

15. The method as recited in claim 6, further comprising performing, at the one or more computing devices:

obtaining, via a programmatic interface, one or more target objectives for a type of data flow task which comprises message transfers between a plurality of services including the first network-accessible service and the second network-accessible service, wherein the one or more target objectives include one or more of: (a) a performance objective, (b) an availability objective, or (c) a concurrency objective;

wherein determining the modification based at least in part on the one or more target objectives.

16. One or more non-transitory computer-accessible storage media storing program instructions that when executed on or across one or more processors cause one or more computer systems to:

configure one or more multi-service network traffic controllers, wherein the one or more multi-service network traffic controllers are connected to a plurality of traffic control implementation units, including at least one traffic control implementation unit activated at a first network-accessible service and at least one traffic control implementation unit activated at a second network-accessible service;

determine, at the one or more multi-service network traffic controllers, based at least in part on data collected from a traffic control implementation unit deployed at the second network-accessible service, a modification to be made to a parameter of a traffic control implementation unit deployed to the first network-accessible service; and cause the modification to be applied at the traffic control implementation unit deployed to the first network-accessible service, wherein the modification results in a change to a traffic flow at the second network-accessible service.

17. The one or more non-transitory computer-accessible storage media as recited in claim 16, storing further program instructions that when executed on or across one or more processors further cause one or more computer systems to:

prior to causing the modification to be applied, provide an indication of the modification via a programmatic interface.

18. The one or more non-transitory computer-accessible storage media as recited in claim 16, storing further program instructions that when executed on or across one or more processors further cause one or more computer systems to:

provide, via a programmatic interface, an indication of a justification for the modification.

19. The one or more non-transitory computer-accessible storage media as recited in claim 16, wherein the traffic control implementation unit activated at the first network-accessible service is activated at one or more of: (a) a compute instance at a virtualization server of a virtualized computing service, (b) a non-virtualized server, (c) a router, (d) a switch, (e) a gateway, or (f) a load balancer.

20. The one or more non-transitory computer-accessible storage media as recited in claim 16, storing further program instructions that when executed on or across one or more processors further cause one or more computer systems to:

obtain metadata pertaining to a plurality of services, including the first network-accessible service and the second network-accessible service;

classify a first subset of the plurality of services, based at least in part on analysis of the metadata, into a first group;

generate a summarized representation of the plurality of services, wherein within the summarized representation, individual services of the first group are replaced by an aggregated logical service; and transmit the summarized representation from the one or more multi-service controllers to one or more recipients.

* * * * *